(12) United States Patent  (10) Patent No.: US 8,614,828 B2
Kuwahara  (45) Date of Patent: Dec. 24, 2013

(54) PRINT APPARATUS, SERVER, METHOD FOR IMPROVING PRINT CHARACTERISTICS, AND COMPUTER PROGRAM THEREFOR

(75) Inventor: Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1165 days.

(21) Appl. No.: 12/080,873

(22) Filed: Apr. 7, 2008

(65) Prior Publication Data

US 2008/0316509 A1 Dec. 25, 2008

(30) Foreign Application Priority Data

May 7, 2007 (JP) .............................. P2007-122387

(51) Int. Cl.
*G06K 15/10* (2006.01)
*B41J 29/38* (2006.01)

(52) U.S. Cl.
USPC ........... 358/1.9; 358/1.8; 358/1.13; 358/1.15; 347/5; 347/10

(58) Field of Classification Search
USPC ........ 358/1.9, 1.8, 1.13, 1.14, 1.15; 347/5, 10
See application file for complete search history.

(56) References Cited

U.S. PATENT DOCUMENTS

| | | | | |
|---|---|---|---|---|
| 6,563,596 | B1 * | 5/2003 | Narushima | 358/1.14 |
| 7,672,021 | B2 * | 3/2010 | Tatsumi | 358/401 |
| 2002/0122204 | A1 * | 9/2002 | Van Der Meijs | 358/1.15 |
| 2002/0145758 | A1 * | 10/2002 | Lin et al. | 358/3.03 |
| 2005/0146557 | A1 * | 7/2005 | Sato et al. | 347/40 |
| 2006/0071953 | A1 * | 4/2006 | Yasue et al. | 347/5 |
| 2006/0071955 | A1 * | 4/2006 | Arazaki | 347/5 |

FOREIGN PATENT DOCUMENTS

| | | |
|---|---|---|
| JP | 02-167755 | 6/1990 |
| JP | 08-039791 | 2/1996 |
| JP | 2001-150701 | 6/2001 |
| JP | 2005-096210 | 4/2005 |
| JP | 2005-246861 | 9/2005 |
| JP | 2005-252633 | 9/2005 |
| JP | 2006-181765 | 7/2006 |

* cited by examiner

*Primary Examiner* — Allen H Nguyen
(74) *Attorney, Agent, or Firm* — Robert J. Depke; The Chicago Technology Law Group, LLC

(57) ABSTRACT

A print apparatus connected to a server via a network includes an improvement-information requesting unit configured to notify the server via the network of identification information unique to a print head; an improvement-information storage unit configured to store downloaded head-characteristic-improvement information; and a print processor configured to perform a print operation by referring to the head-characteristic-improvement information stored in the improvement-information storage unit.

12 Claims, 35 Drawing Sheets

FIG. 20

| SELECTION INFORMATION | BOUNDARY-VALUE TABLE |
|---|---|
| 1 | BOUNDARY-VALUE TABLE 1 |
| 2 | BOUNDARY-VALUE TABLE 2 |
| 3 | BOUNDARY-VALUE TABLE 3 |
| ⋮ | ⋮ |
| N-1 | BOUNDARY-VALUE TABLE N-1 |
| N | BOUNDARY-VALUE TABLE N |

FIG. 21

| DETERMINATION INFORMATION (AVERAGE NOZZLE DIAMETER) | BOUNDARY-VALUE TABLE |
|---|---|
| 10.1 | BOUNDARY-VALUE TABLE 1 |
| 10.2 | BOUNDARY-VALUE TABLE 2 |
| 10.3 | BOUNDARY-VALUE TABLE 3 |
| ⋮ | ⋮ |

FIG. 26

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 42 | 0 | 138 | 0 | 1 |
| 2 | 43 | 0 | 138 | 0 | 1 |
| 3 | 44 | 0 | 138 | 0 | 1 |
| 4 | 44 | 0 | 138 | 0 | 1 |
| 5 | 45 | 0 | 138 | 0 | 1 |
| 6 | 46 | 0 | 138 | 0 | 1 |
| ⋮ | ⋮ | ⋮ | ⋮ | ⋮ | ⋮ |
| 248 | 250 | 212 | 255 | 2 | 3 |
| 249 | 251 | 212 | 255 | 2 | 3 |
| 250 | 252 | 212 | 255 | 2 | 3 |
| 251 | 252 | 212 | 255 | 2 | 3 |
| 252 | 253 | 212 | 255 | 2 | 3 |
| 253 | 254 | 212 | 255 | 2 | 3 |
| 254 | 254 | 212 | 255 | 2 | 3 |
| 255 | 255 | 255 | 255 | 3 | 3 |

FIG. 27

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 24 | 0 | 76 | 0 | 1 |
| 2 | 24 | 0 | 76 | 0 | 1 |
| 3 | 25 | 0 | 76 | 0 | 1 |
| 4 | 26 | 0 | 76 | 0 | 1 |
| 5 | 26 | 0 | 76 | 0 | 1 |
| 6 | 27 | 0 | 76 | 0 | 1 |
| ⋮ | ⋮ | ⋮ | ⋮ | ⋮ | ⋮ |
| 248 | 250 | 224 | 255 | 4 | 5 |
| 249 | 251 | 224 | 255 | 4 | 5 |
| 250 | 252 | 224 | 255 | 4 | 5 |
| 251 | 252 | 224 | 255 | 4 | 5 |
| 252 | 253 | 224 | 255 | 4 | 5 |
| 253 | 254 | 224 | 255 | 4 | 5 |
| 254 | 254 | 224 | 255 | 4 | 5 |
| 255 | 255 | 255 | 255 | 5 | 5 |

FIG. 28

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 31 | 0 | 100 | 0 | 1 |
| 2 | 31 | 0 | 100 | 0 | 1 |
| 3 | 32 | 0 | 100 | 0 | 1 |
| 4 | 33 | 0 | 100 | 0 | 1 |
| 5 | 34 | 0 | 100 | 0 | 1 |
| 6 | 34 | 0 | 100 | 0 | 1 |
| ⋮ | ⋮ | ⋮ | ⋮ | ⋮ | ⋮ |
| 248 | 250 | 220 | 255 | 3 | 4 |
| 249 | 251 | 220 | 255 | 3 | 4 |
| 250 | 252 | 220 | 255 | 3 | 4 |
| 251 | 252 | 220 | 255 | 3 | 4 |
| 252 | 253 | 220 | 255 | 3 | 4 |
| 253 | 254 | 220 | 255 | 3 | 4 |
| 254 | 254 | 220 | 255 | 3 | 4 |
| 255 | 255 | 255 | 255 | 4 | 4 |

PRINT APPARATUS, SERVER, METHOD FOR IMPROVING PRINT CHARACTERISTICS, AND COMPUTER PROGRAM THEREFOR

CROSS REFERENCES TO RELATED APPLICATIONS

The present invention contains subject matter related to Japanese Patent Application JP 2007-122387 filed in the Japanese Patent Office on May 7, 2007, the entire contents of which are incorporated herein by reference.

BACKGROUND OF THE INVENTION

1. Field of the Invention

The present invention relates to techniques for improving print characteristics unique to print heads by removing or reducing variations in the print characteristics. More particularly, the present invention relates to a print apparatus, a server, a method for improving print characteristics, and a computer program therefor.

2. Description of the Related Art

Print quality greatly varies due to print characteristics of print heads. Print characteristics of actual print heads are not constant. Print characteristics vary from one print head to another. These variations in print characteristics cause variations in print quality.

Variations in print quality can be classified into two types: variations in print characteristics among overall print heads, and variations in print characteristics among individual print elements constituting a print head or among individual columns of pixels.

SUMMARY OF THE INVENTION

The following description concerns effects of variations in print characteristics on print quality according to types of print characteristics.

(A) Problem Due to Variations Among Print Heads

Print quality is greatly affected by tone-level characteristics. The following description concerns effects of variations in print characteristics on tone-level characteristics using an inkjet print apparatus by way of example.

FIG. 1 illustrates an exemplary structure of a print processor 1.

Digital data in a red, green, and blue (RGB) format, for example, is provided as input data to the print processor 1. In the example shown in FIG. 1, the bit length of the input data corresponding to each color is eight bits. Thus, the digital data of each color has information indicating 256 tone levels from 0 to 256. The bit length of the input data corresponding to three colors is 24 bits.

A color converter 3 performs processing to convert the input data into data corresponding to four colors including yellow (M), magenta (M), cyan (C), and black (K) corresponding to the colors of ink (data corresponding to each color has eight bits and indicates 0 to 255 tone levels).

A halftoning unit 5 performs processing to convert the color-converted data into drive data for a print head 7 including sections corresponding to the respective colors.

The print head 7 ejects ink droplets on the basis of the drive data and forms a print image on a medium to be printed.

The density of an output result of each color corresponding to the values 0 to 255 of the color-converted data output from the color converter 3 is preferably an ideal value (for example, the relationship shown in FIG. 2). Actually, however, as shown in FIG. 3, the density is generally not an ideal value.

Therefore, the print processor 1 having a structure shown in FIG. 4 is generally used, and a method for correcting the output result of each color to obtain an ideal value is used. That is, a tone-level correction unit 9 having a tone-level correction curve shown in FIG. 5 is located at the subsequent stage of the color converter 3. Using the tone-level correction unit 9, tone-level characteristics (FIG. 3) of an input signal (color-converted data) are corrected so that the output result can be on the line shown in FIG. 2.

In the case where the tone-level correction curve is fixed, if print characteristics vary from one print head to another, the tone-level density of each print head is difficult to be corrected to an optimal state. To overcome this problem, a tone-level correction curve according to the print characteristics of each print head may be used.

In order to perform this, tone-level correction curve data that is optimal for each print head is necessary to be stored. That is, each print head is necessary to have a storage medium. If this is the case, the cost of each print head is increased.

In order to reduce the cost as much as possible, information for selecting or determining optimal tone-level correction curve data may be stored in each print head. On the basis of the information, optimal data may be selected from among items of pre-stored tone-level correction curve data. Alternatively, optimal tone-level correction curve data may be generated.

Since the tone-level correction curve data or its selection data (including determination data) exists only in the storage medium included in each print head, if the information is lost or difficult to be read to the outside for a certain reason, it is difficult for the print head to perform its original performance.

In the case where the tone-level correction curve data is rewritten by the print head, a shipping source of the print apparatus has no idea as to which tone-level correction curve data is used to perform printing. If the shipping source is notified of a failure, such as deterioration of tone-level characteristics, the shipping source may have difficulty in determining the cause of deterioration of tone-level characteristics.

(B) Problem Due to Variations Among Print Elements Constituting Print Head

Variations in print characteristics (ink ejection characteristics) among a plurality of print elements cause variations in density. In order to overcome the effect of these variations, in the related art, optimal tone-level correction curve data for each print element is stored in a storage medium, and input data corresponding to each print element is corrected on the basis of the optimal tone-level correction curve data. Accordingly, variations in the output result are made not so striking.

Even in this case, however, the number of storage areas necessary for storing correction information is the number of print elements, which results in an increase in the cost of the print head 7.

In order to reduce the cost as much as possible, information for selecting or determining optimal tone-level correction data is stored in each print head. On the basis of the information, optimal data may be selected from among items of pre-stored tone-level correction curve data. Alternatively, optimal tone-level correction curve data may be generated.

Since the tone-level correction curve data or its selection data or the like exists only in the storage medium included in each print head, if the information is lost or difficult to be read to the outside for a certain reason, it is difficult for the print head to perform its original performance.

In the case where the tone-level correction curve data is rewritten by the print head, a shipping source of the print apparatus has no idea as to which tone-level correction curve data is used to perform printing. If the shipping source is notified of a failure, such as deterioration of tone-level characteristics, the shipping source may have difficulty in taking appropriate measures to overcome the problem.

It is desirable to provide, by focusing on a network communication function of a print apparatus, a mechanism that enables a server to manage necessary information and a mechanism that enables the print apparatus to download the information and to reflect the downloaded information in print processing.

According to an embodiment of the present invention, there is provided a print apparatus including an improvement-information requesting unit configured to notify a server via a network of identification information unique to a print head, an improvement-information storage unit configured to store downloaded head-characteristic-improvement information, and a print processor configured to perform a print operation by referring to the head-characteristic-improvement information stored in the improvement-information storage unit.

According to another embodiment of the present invention, a server includes a storage area configured to store identification information unique to a print head and head-characteristic-improvement information in correspondence with each other and an improvement-information providing unit configured to read, upon receipt of the identification information unique to the print head via a network, head-characteristic-improvement information corresponding to the identification information from the storage area and to send the head-characteristic-improvement information.

In the case of the mechanism proposed by the inventor, improvement information for print characteristics relating to the print head or individual print elements constituting the print head can be managed by the server. Therefore, the print head is not necessary to include a large-capacity storage medium, and hence an increase in the cost of the print head is avoided.

The improvement information for the print characteristics can be stored in the storage area of the print apparatus. Compared with a case where the improvement information is stored in a storage area of the print head, the amount of information stored can be increased.

Since the server can manage the improvement information, even when a trouble relating to print quality occurs, the cause of the trouble can be easily detected.

BRIEF DESCRIPTION OF THE DRAWINGS

FIG. 20 illustrates exemplary table data;

FIG. 21 illustrates exemplary table data;

FIG. 26 illustrates an exemplary boundary-value table (the number of boundary values=4);

FIG. 27 illustrates an exemplary boundary-value table (the number of boundary values=6);

FIG. 28 illustrates an exemplary boundary-value table (the number of boundary values=5);

DESCRIPTION OF THE PREFERRED EMBODIMENTS

Figure 1:
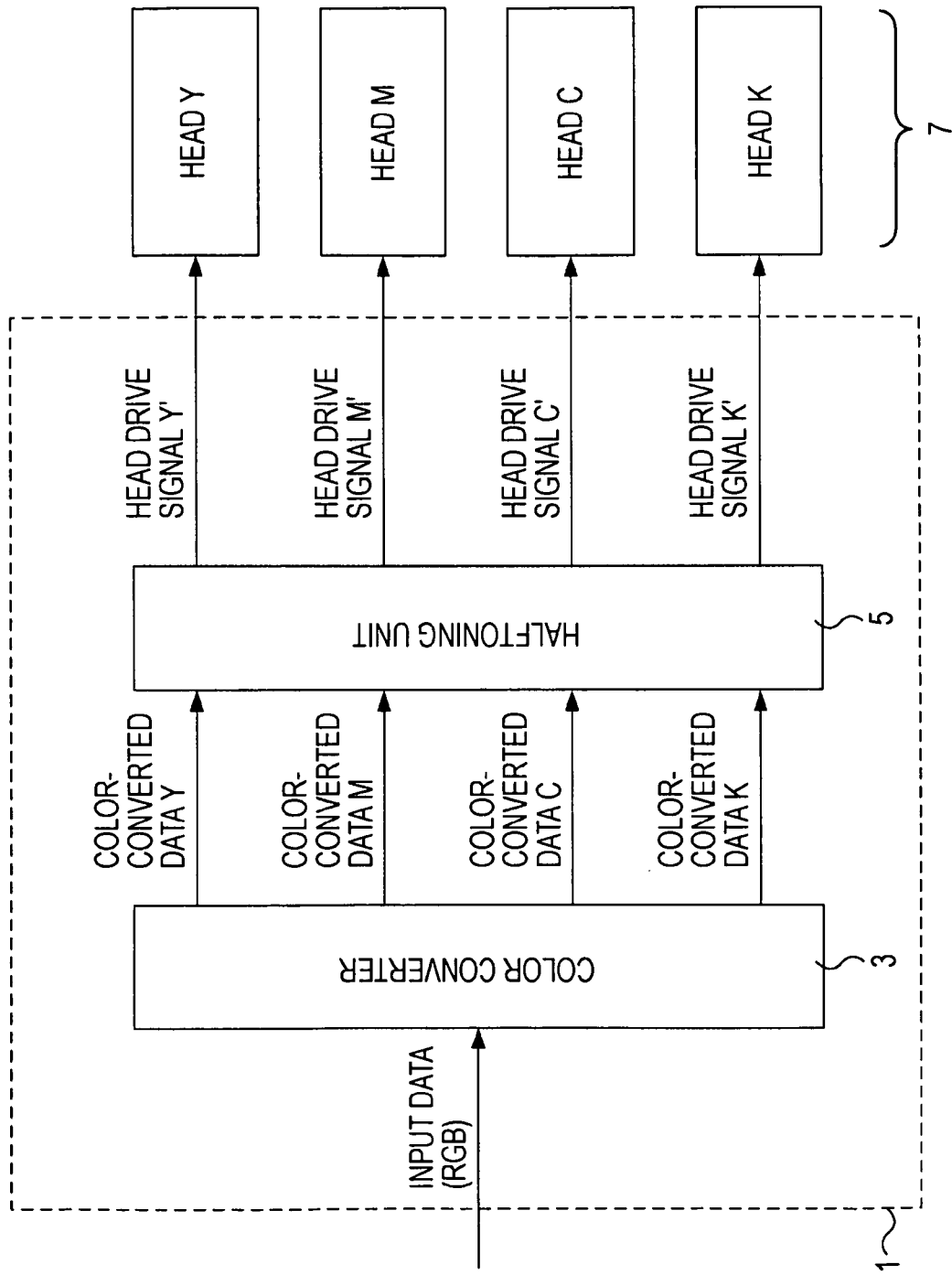
FIG. 1 is a diagram illustrating the schematic flow of data processing performed by a print apparatus.
Figure 2:
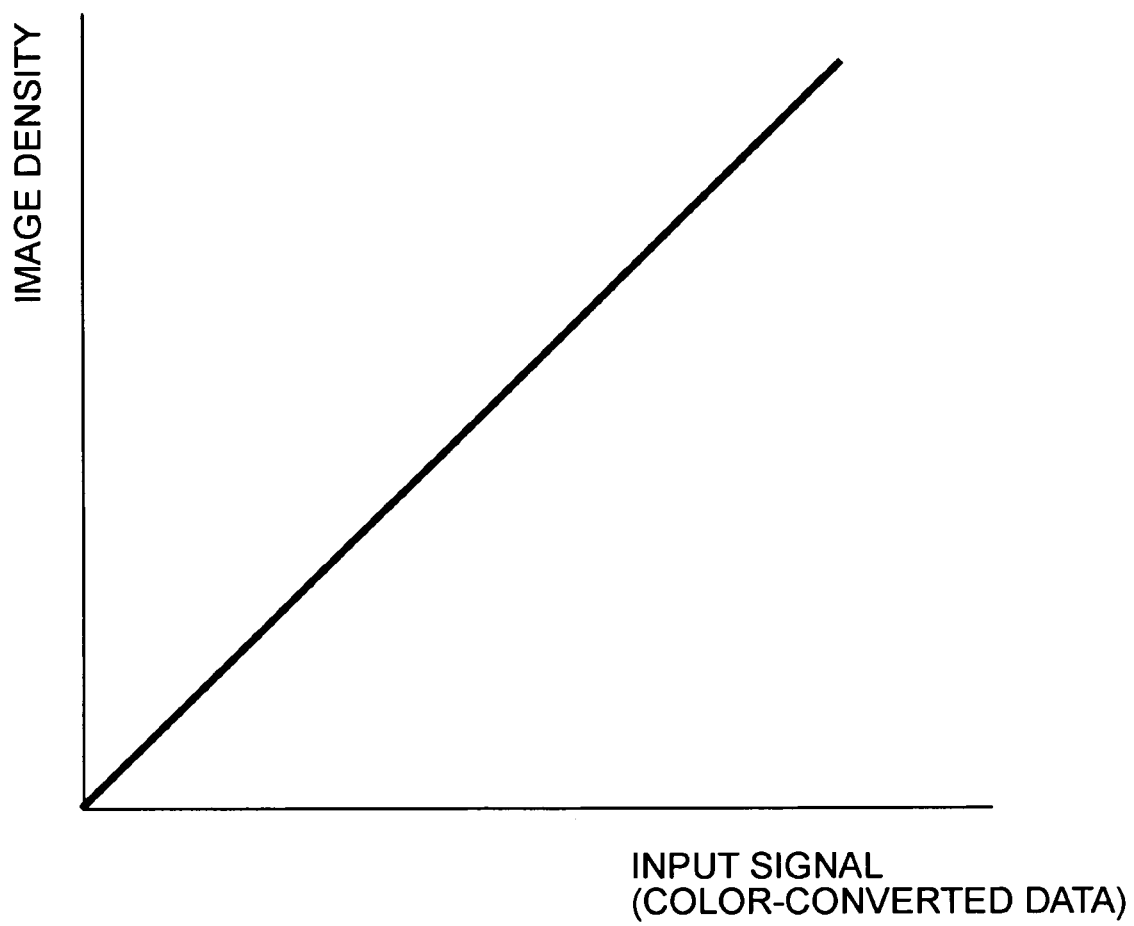
FIG. 2 is a graph illustrating ideal tone-level characteristics.
Figure 3:
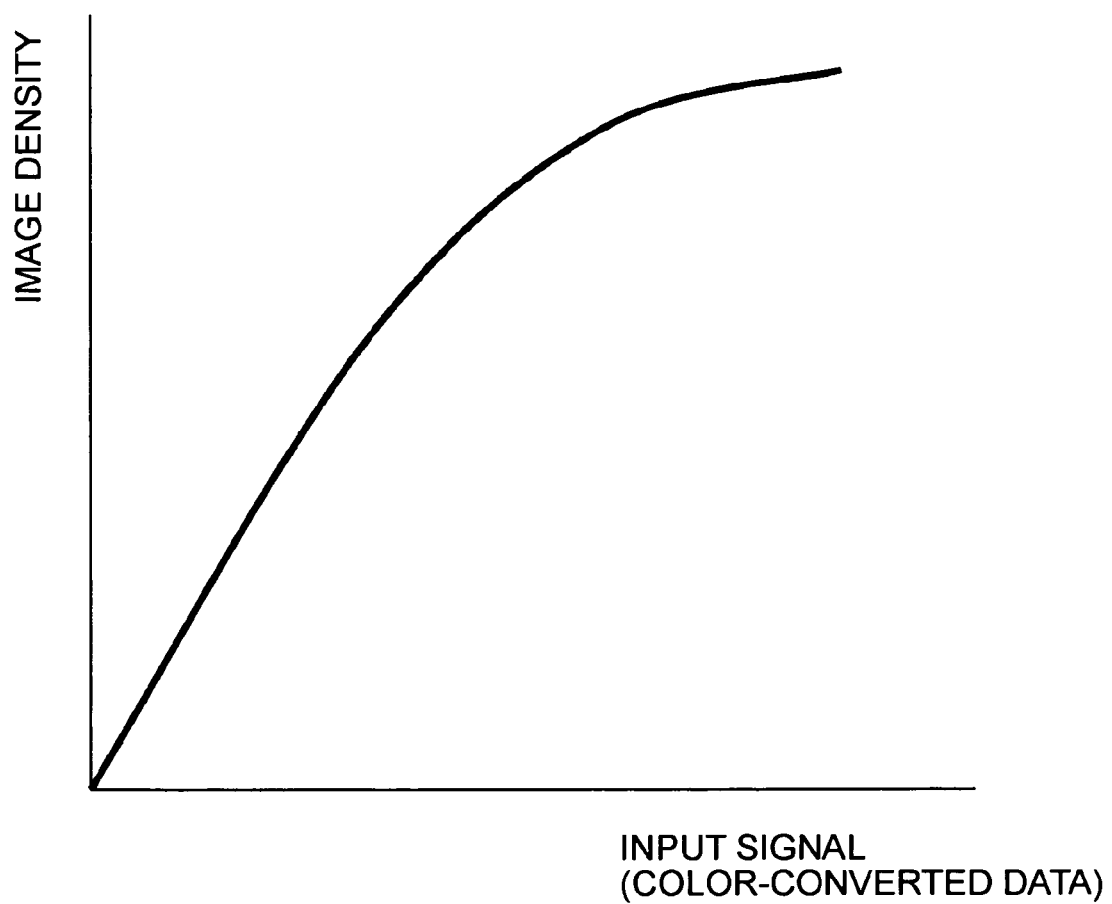
FIG. 3 is a graph illustrating tone-level characteristics that saturate in a high density region.
Figure 4:
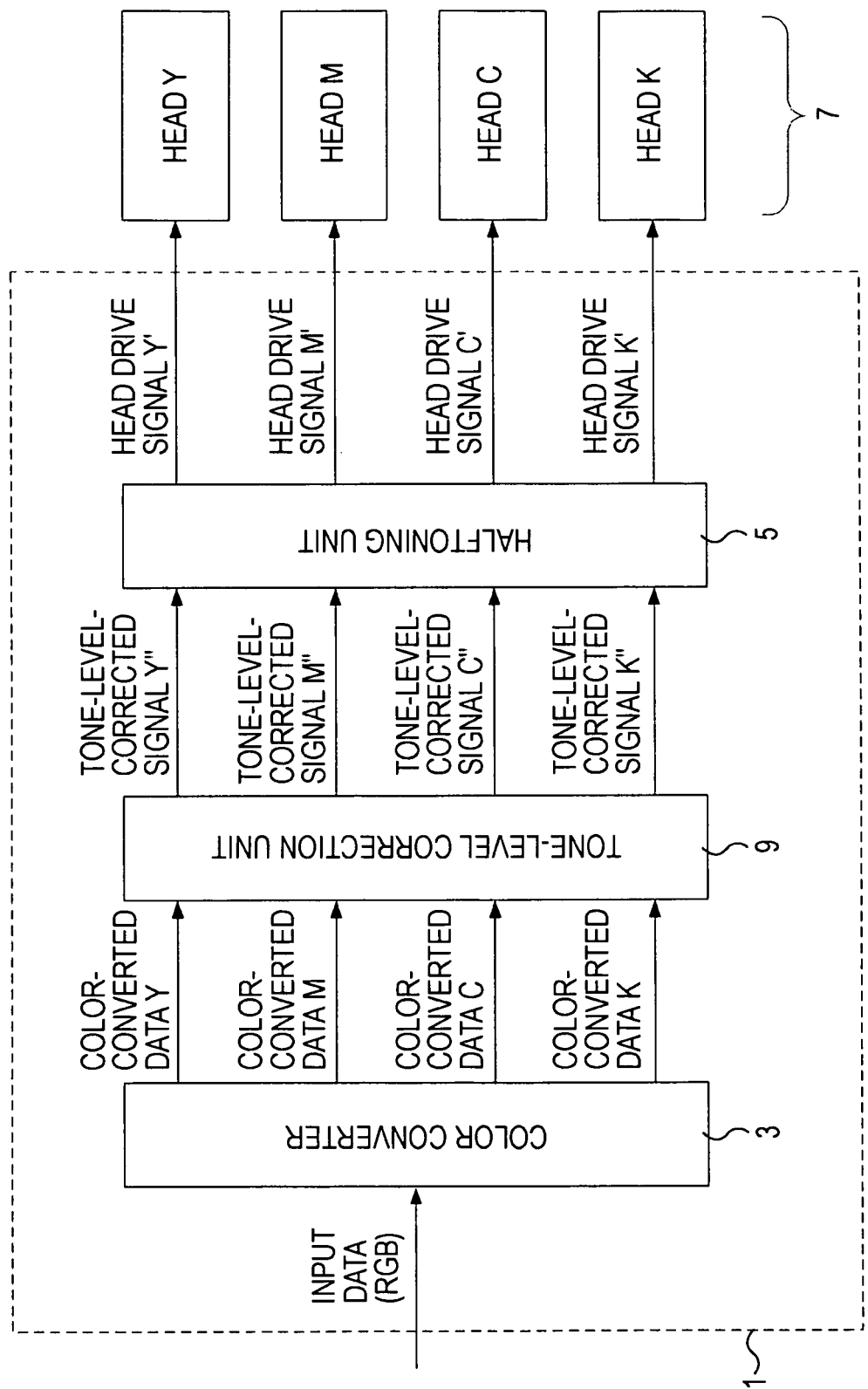
FIG. 4 is a diagram illustrating an exemplary data processing system with a tone-level correction function.
Figure 5:
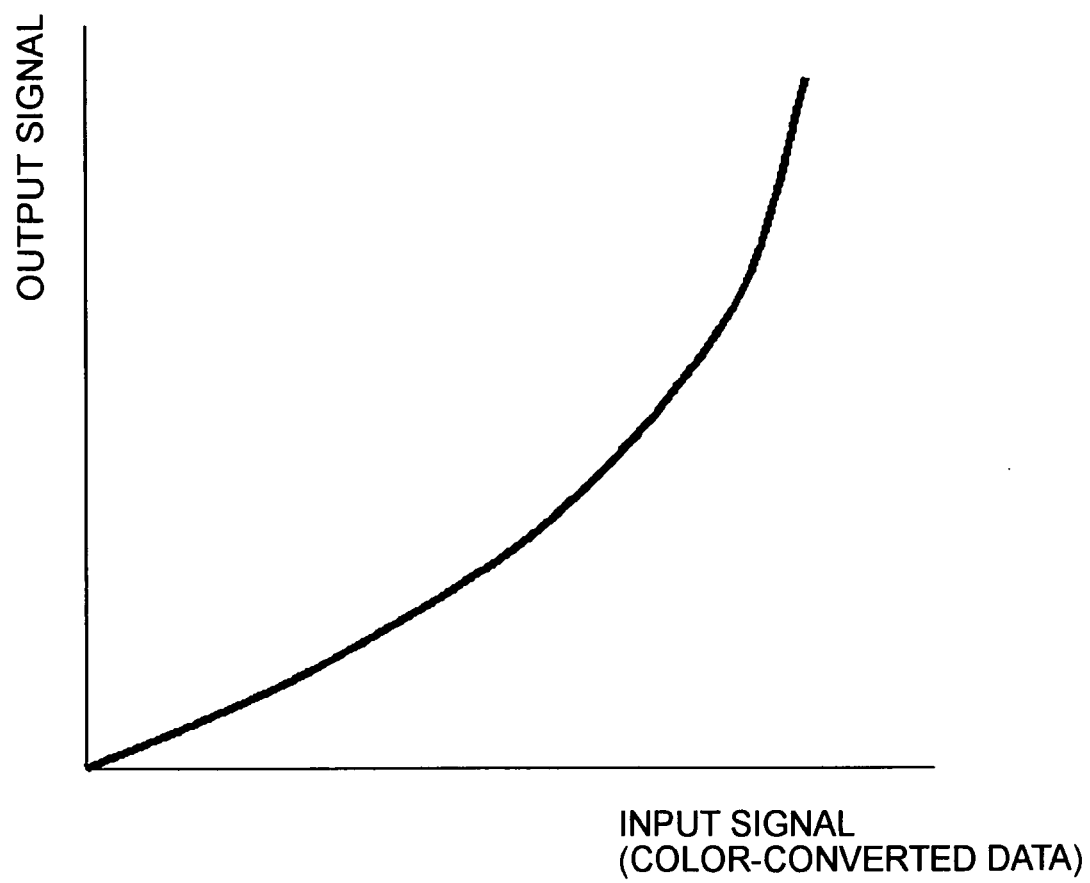
FIG. 5 is a graph illustrating an exemplary tone-level correction curve.

Techniques for improving print characteristics according to embodiments of the present invention will now be described.

Techniques and elements in the related art are applied to portions that are not particularly shown in the drawings or described in the specification.

The following embodiments are only exemplary embodiments of the present invention, and the present invention is not limited thereto.

(A) Overall Configuration of Print System

Figure 6:
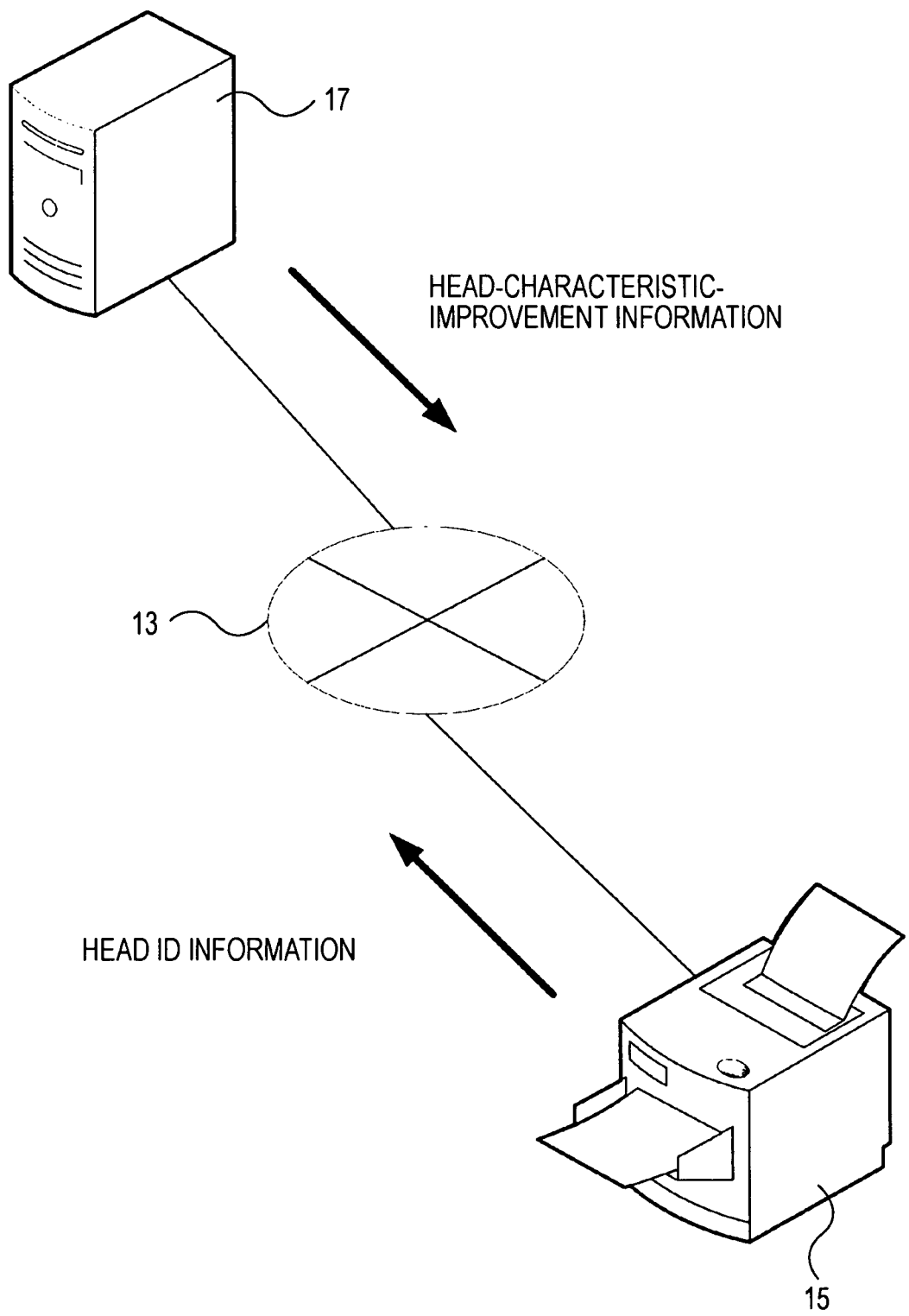
FIG. 6 is an illustration of the concept of a proposed print system.

FIG. 6 illustrates the overall configuration of a print system 11. The print system 11 proposed by the inventor includes a print apparatus 15 and a server 17, which are connected to each other via a network 13.

The print apparatus 15 sends head identification (ID) information for specifying a print head (for example, a serial number) to the server 17 and obtains head-characteristic-improvement information corresponding to the head ID information from the server 17.

The network 13 may be a wireless network or a wired network. It is assumed that the network 13 is, for example, the Internet.

Figure 7:
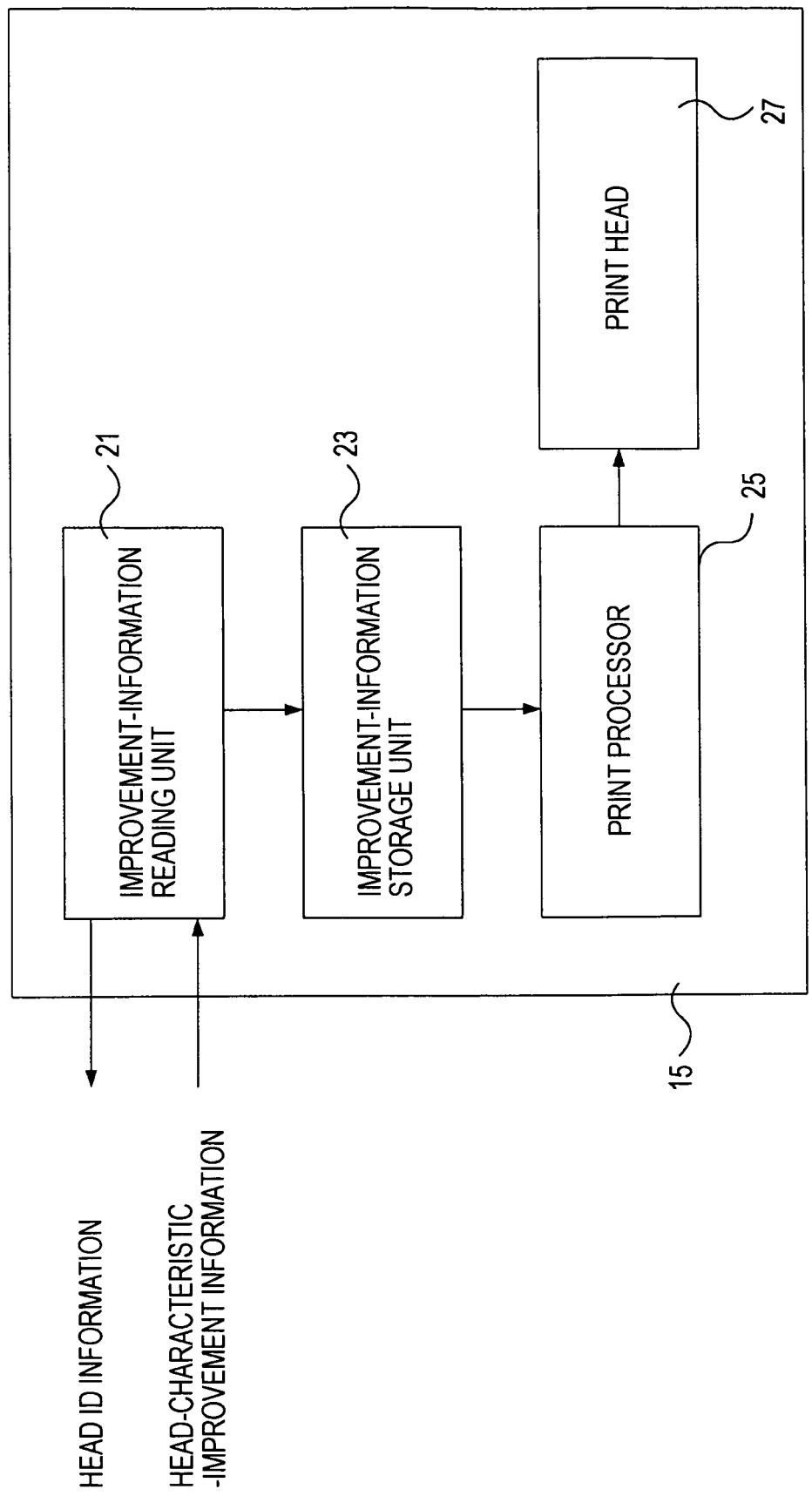
FIG. 7 is a diagram of an exemplary functional structure of the print apparatus.

FIG. 7 illustrates an exemplary functional structure of the print apparatus 15. The print apparatus 15 includes an improvement-information reading unit 21, an improvement-information storage unit 23, a print processor 25, and a print head 27.

Among these elements, the improvement-information reading unit 21 has a processing function of downloading, from the server 17, information (head-characteristic-improvement information) necessary for improving print characteristics of the print head 27 mounted on the print apparatus 15.

Thus, the improvement-information reading unit 21 has a function of communicating with the network 13. Furthermore, the improvement-information reading unit 21 has a processing function of optically or electrically reading head ID information attached to the print head 27 when the print head 27 is mounted onto the print apparatus 15 and notifying the server 17 of the head ID information.

Various formats are available for recording the head ID information. For example, the head ID information may be stored as digital data in a semiconductor memory or an integrated circuit (IC) tag of a print head. Alternatively, for example, the head ID information may be stored as a resistance or a pattern of arranging points of contact.

Alternatively, for example, the head ID information may be stored as a logical circuit or another electrically-readable structure. Alternatively, for example, the head ID information may be stored as an optically-readable structure pattern, such as a print pattern (barcode) on a surface of a housing. Alternatively, for example, the head ID information may be stored as a mechanically-readable structure pattern, such as a notch, from which information is readable based on a mechanical connection.

Alternatively, for example, a user may enter head ID information using a keyboard or a key switch attached to the print apparatus or through a computer or the like connected to the print apparatus and notify the server of the head ID information. In this case, the head ID information may be printed on the print head or the print apparatus (set), on a separate seal attached to the print head or the print apparatus (set), or on a document supplied with the print head or the print apparatus (set). That is, the head ID information may be provided in various formats in which the user can check and see the head ID information.

The improvement-information storage unit 23 is a storage area that stores head-characteristic-improvement information downloaded from the server 17. A partial area of a storage medium included in a main body of the print apparatus 15 is used as the improvement-information storage unit 23. For example, a flash memory, a magnetic disk drive, or another rewritable storage medium is used.

The print processor 25 is a signal processor that performs color conversion, tone-level correction, halftoning, and other processing. The print processor 25 obtains head-characteristic-improvement information from the improvement-information storage unit 23 and uses the head-characteristic-improvement information for performing signal processing. In this exemplary embodiment, the processing function of the print processor 25 is realized as software processing.

The print head 27 has a mechanism that can be attached to and detached from the print apparatus 15. It is assumed that the print head 27 can be replaced not only by the user, but also by support staff.

Figure 8:
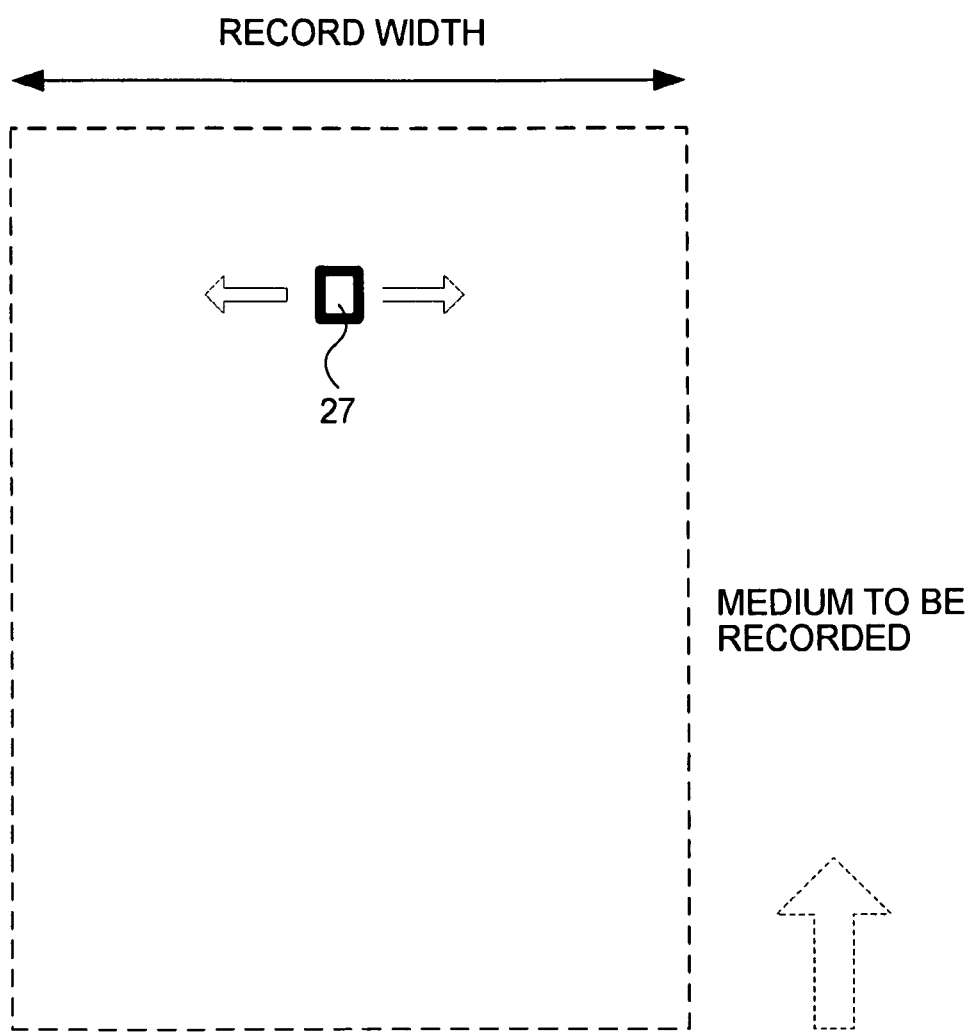
FIG. 8 is an illustration of a print method using a serial head.

A print type (print mechanism) of the print head 27 may be a serial head type or a line head type. In the case of a serial head type shown in FIG. 8, the width in which print elements are arranged is shorter than the recording width. Therefore, a print image is formed by conveying a medium to be recorded little by little, stopping the medium, and causing the print head 27 to move back and forth with respect to the recording width direction of the medium to be recorded, thereby performing printing.

Figure 9A:
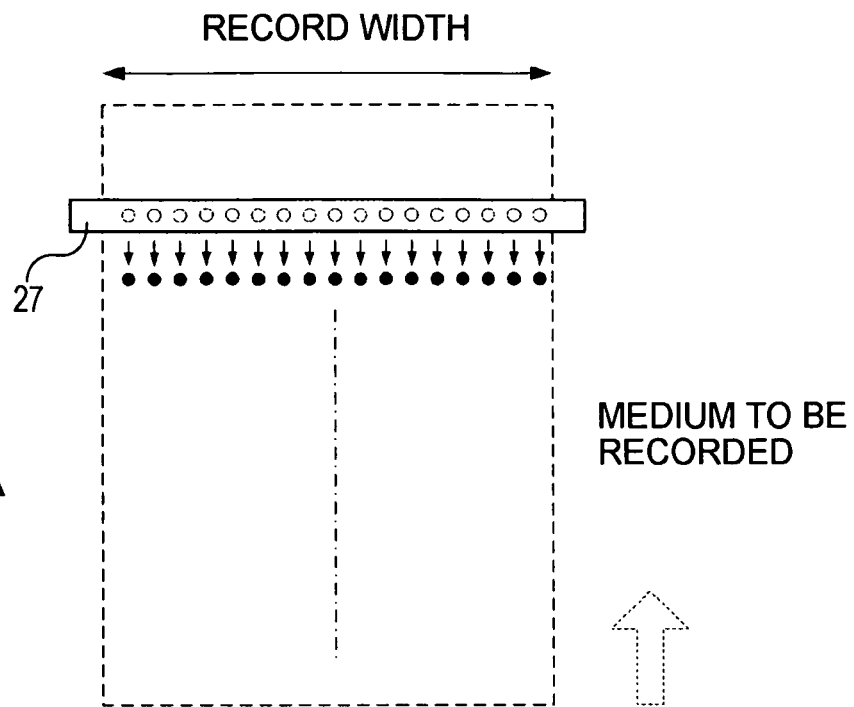
FIGS. 9A and 9B are illustrations of a print method using a line head.
Figure 9B:
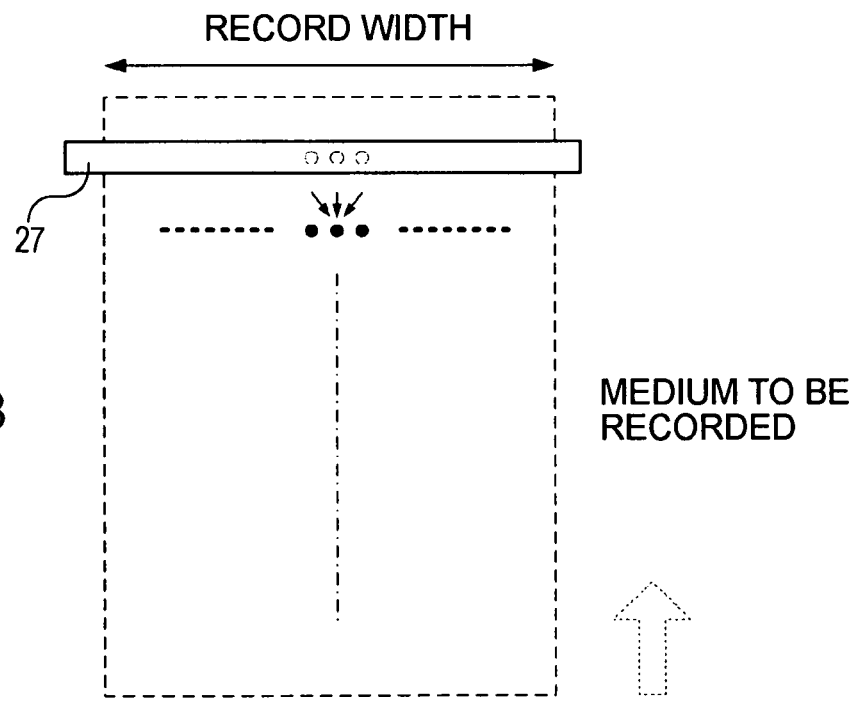

In contrast, in the case of a line head type shown in FIGS. 9A and 9B, the width in which print elements are arranged is the same or slightly wider than the recording width. Therefore, a print image can be formed by conveying a medium to be recorded in a conveying direction while having the print head in a fixed state and by performing printing using the print head. In contrast, a print image may be formed by having the medium to be recorded in a fixed state and by conveying the print head and performing printing using the print head.

Regarding the print head 27 of line head type, two methods are available. In one method shown in FIG. 9A, one column of pixels is printed by one print element. In the other method shown in FIG. 9B, one column of pixels is printed by a plurality of print elements.

The print method shown in FIG. 9A is adopted by thermal heads and inkjet print heads. In contrast, the print method shown in FIG. 9B is adopted by inkjet print heads proposed by the assignee of the present invention.

Figure 10A:
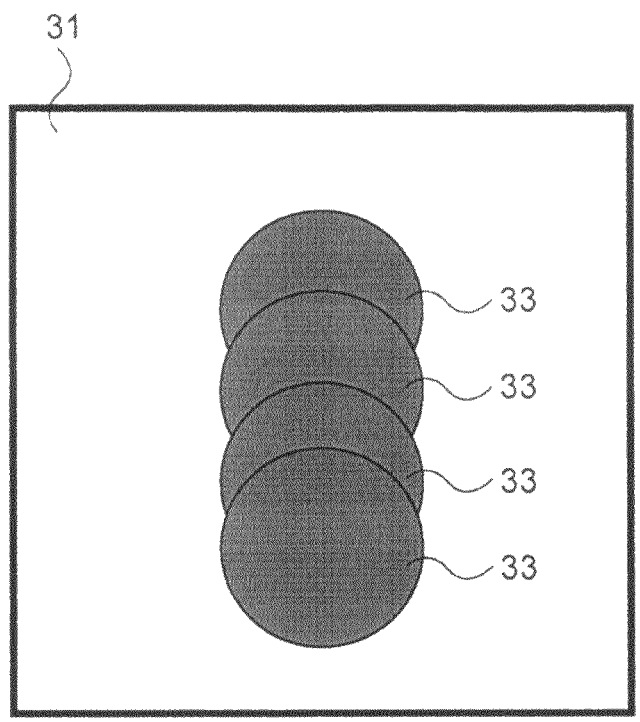
FIGS. 10A and 10B are illustrations of a print method capable of representing one pixel using multiple tone levels.

There are print heads that can represent multiple tone levels in one pixel. For example, referring now to FIGS. 10A and 10B, multiple tone levels can be represented by forming a plurality of dots 33 in one pixel region 31. FIG. 10A illustrates an example of a print method of forming four dots 33 in the pixel region 31 in an overlapping manner.

Figure 10B:
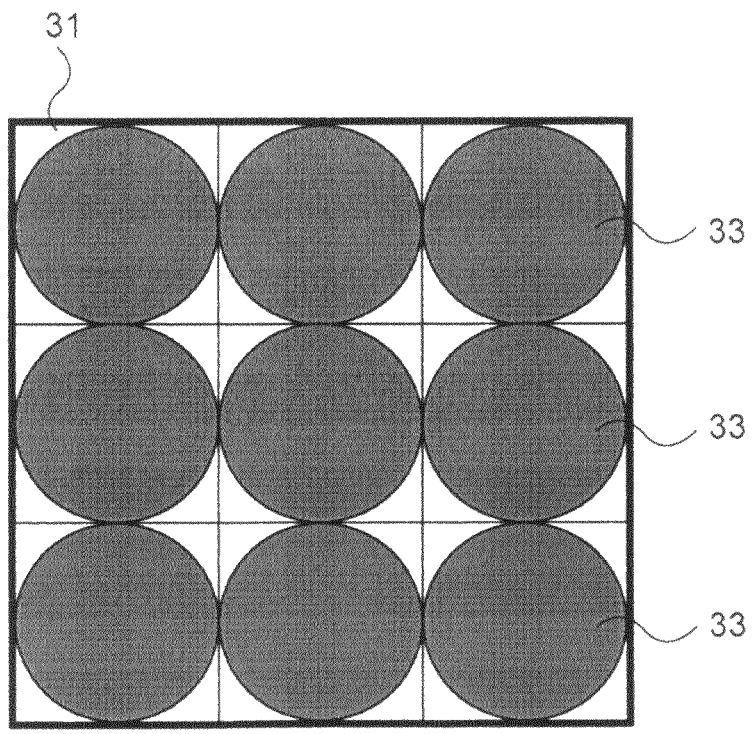

FIG. 10B illustrates an example of a print method of dividing the pixel region 31 into nine sub-pixel regions and printing one pixel using nine dots at maximum.

Figure 11A:
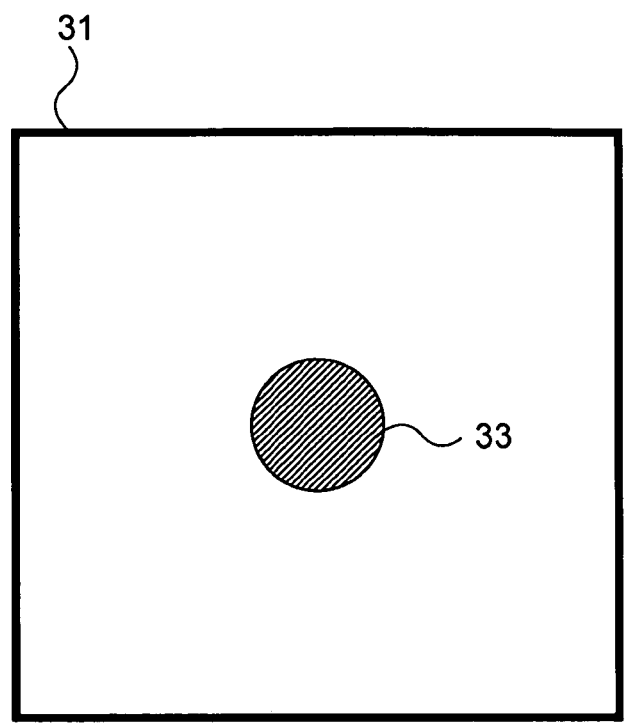
FIGS. 11A and 11B are illustrations of a print method capable of representing one pixel using multiple tone levels.
Figure 11B:
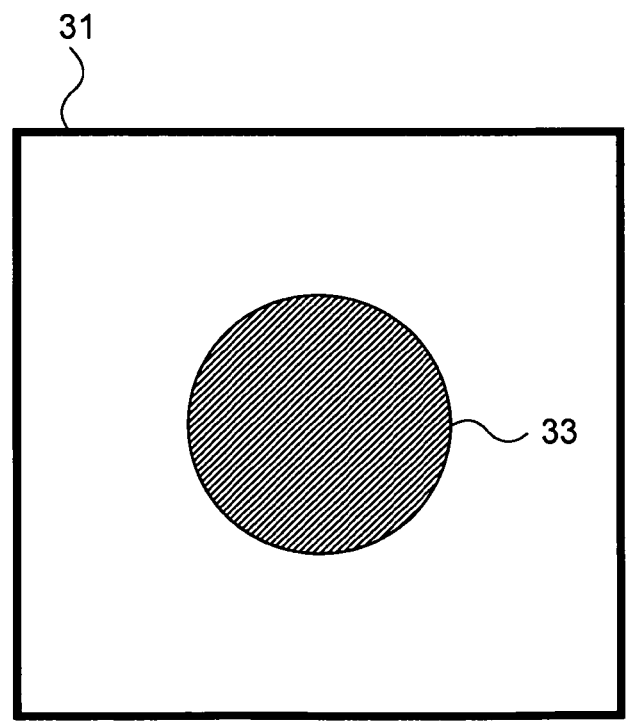

Alternatively, referring now to FIGS. 11A and 11B, multiple tone levels can be represented by changing the size of the dot 33.

FIG. 11A illustrates the case where the dot 33 has a small size. FIG. 11B illustrates the case where the dot 33 has a large size.

Figure 12:
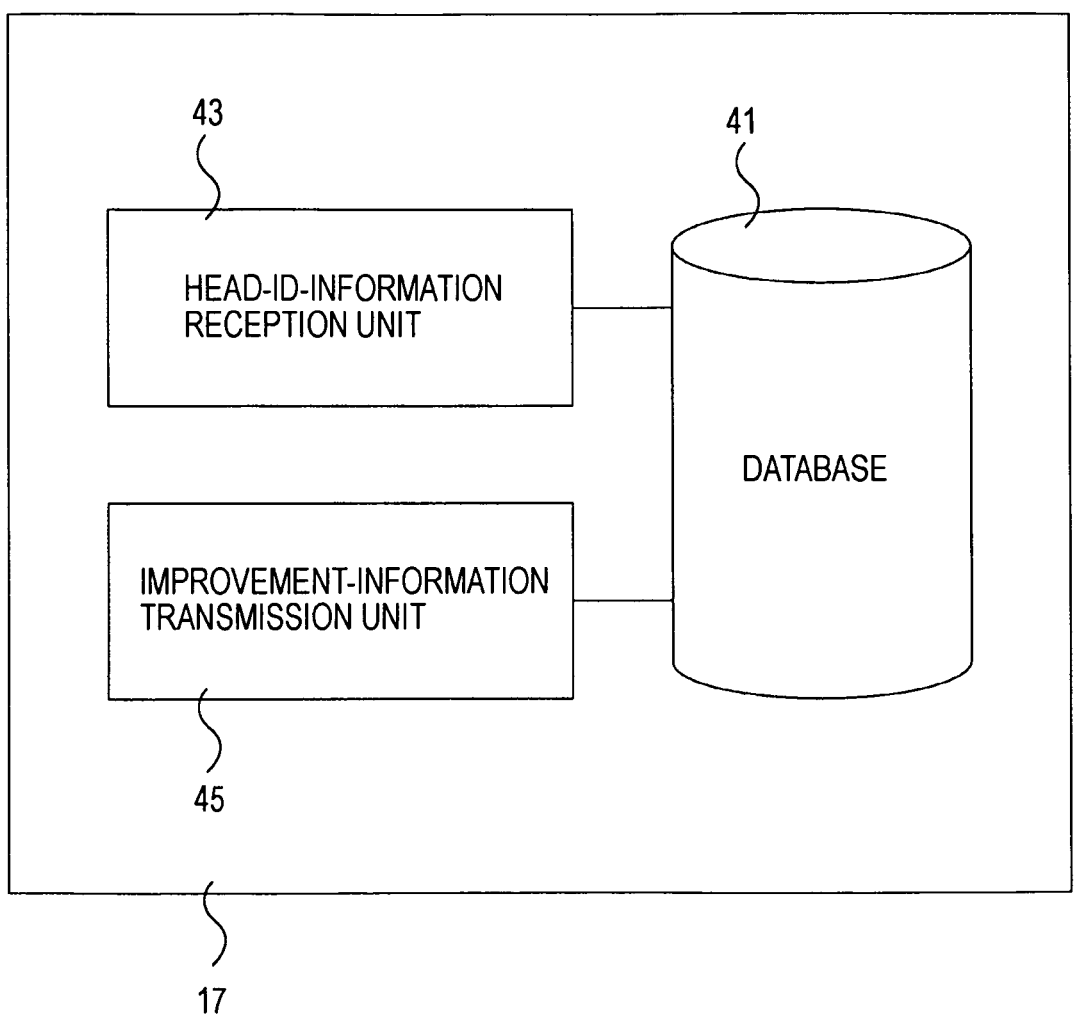
FIG. 12 is a diagram of an exemplary functional structure of a server.

FIG. 12 illustrates an exemplary functional structure of the server 17. The server 17 includes a database 41, a head-ID-information reception unit 43, and an improvement-information transmission unit 45.

Among the foregoing elements, the database 41 is a storage area that stores head ID information (e.g., a serial number) given to each print head 27 and its head-characteristic-improvement information in correspondence with each other.

Since all items of information to be managed are stored in the database 41, for example, a large-capacity hard disk drive is used as the database 41.

The head-ID-information reception unit 43 realizes a processing function of receiving head ID information from the print apparatus 15 via the network 13. In contrast, the improvement-information transmission unit 45 realizes a processing function of reading head-characteristic-improvement information corresponding to the head ID information from the database 41 and transmitting the head-characteristic-improvement information to the print apparatus 15.

The head-characteristic-improvement information may be provided for each print head, as has been described above, or may be provided for individual print elements of a print head or for individual columns of pixels. The head-characteristic-improvement information may include, besides information stored at the time of product shipment, additional information set at the maintenance time or the repairing time.

For example, the head-characteristic-improvement information may include improvement information set by support staff at the maintenance time. When there is a request from the user that tone-level characteristics have deteriorated and hence the user wants improvement of the tone-level characteristics, the support staff may check the current print characteristics of the apparatus and provide improvement information based on analysis of the result. The mechanism of enabling the support staff to check the print characteristics includes a method of sending the print result of a test pattern by mail or the like to the support staff, a method of optically scanning the print result of a test pattern and sending scanned image data via the network 13 to the support staff, and the like.

Alternatively, the head-characteristic-improvement information may include data values used in printing, selection information for selecting the data (in the case where data values to be used in printing are stored as selectable values in the print apparatus 15), or determination information for determining the data (in the case where data values to be used in printing can be determined by the print apparatus 15).

The selection information includes, for example, an ID code for specifying a data value. The selection information includes, for example, an average nozzle diameter of an inkjet print head. The nozzle diameter of a print head affects the diameter of a dot formed by the print head and hence greatly affects the reproducibility of tone-level information formed on a medium to be recorded.

In these cases, pairs of the ID code or the average nozzle diameter and a corresponding data value may be stored in advance in the print apparatus.

Alternatively, the head-characteristic-improvement information may be representative values necessary for generating a group of data values used in printing. Such head-characteristic-improvement information is used when the print apparatus can generate other data values on the basis of the representative values.

Figure 13:
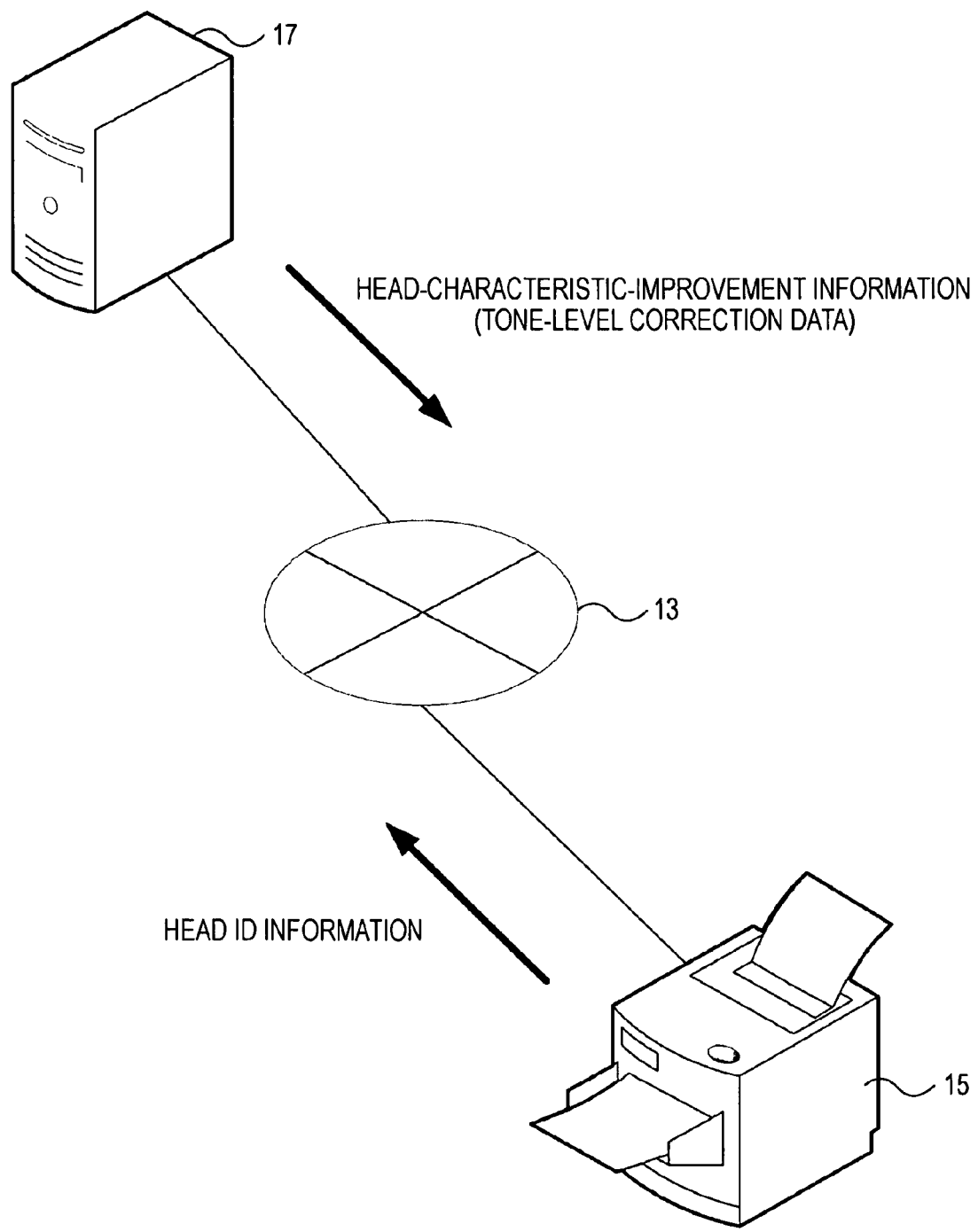
FIG. 13 is an illustration of an example in which tone-level correction data is downloaded.

(B) Examples of Improvement of Print Characteristics (B-1) Example of Downloading Tone-Level Correction Data The following description concerns the case where tone-level correction data is provided as head-characteristic-improvement information. FIG. 13 is an illustration of this exemplary case. That is, the case where the server 17 sends tone-level correction data corresponding to head ID information to the print apparatus 15 is described below.

(a) Case in which Tone-Level Correction Data is Provided for Each Print Head

The case in which tone-level correction data is provided for each print head is described.

In this example, there are cases where tone-level correction data is provided for each color and for each head chip.

In the case where tone-level correction data is provided for each color, tone-level correction data is provided for colors including yellow (Y), magenta (M), cyan (C), and black (K).

In the case where tone-level correction data is provided for each head chip, tone-level correction data is prepared for individual head chips constituting the print head 27.

For example, a line-head-type print head has a long head length. Thus, a plurality of head chips are often combined to constitute one print head.

Figure 14:
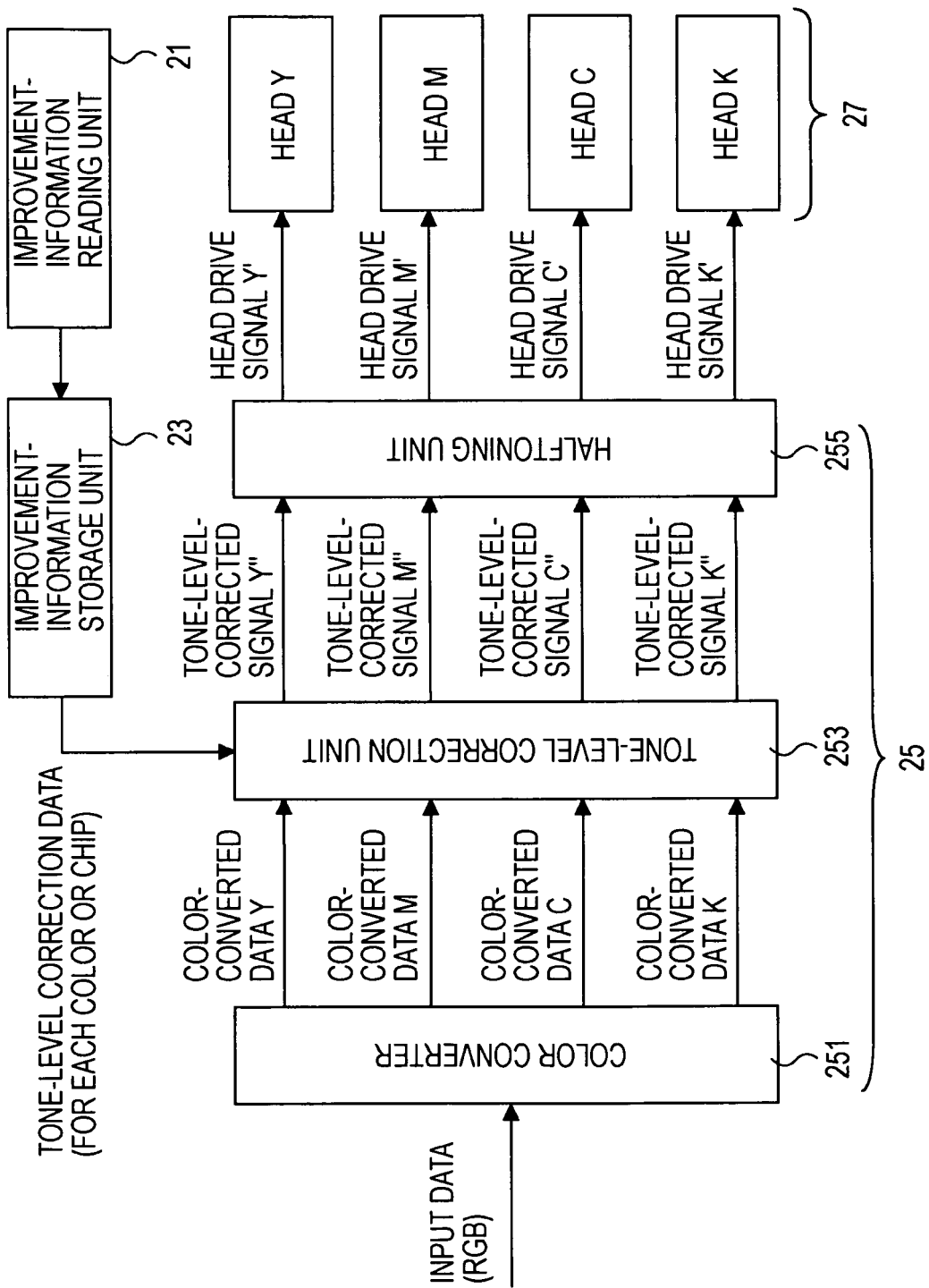
FIG. 14 is a diagram of an exemplary print apparatus using a method of referring to downloaded tone-level correction data.

FIG. 14 illustrates an exemplary print apparatus of this type. A print apparatus 51 shown in FIG. 14 includes the improvement-information reading unit 21, the improvement-information storage unit 23, the print processor 25 (a color converter 251, a tone-level correction unit 253, and a halftoning unit 255), and the print head 27.

In the case of the print apparatus 51, when printing is performed for the first time or when the print head 27 is attached, the improvement-information reading unit 21 reads a serial number of the print head 27 and supplies the serial number to the server 17 via the network 13. Also, the improvement-information reading unit 21 downloads tone-level correction data corresponding to the serial number from the server 17.

The downloaded tone-level correction data is stored in the improvement-information storage unit 23. The tone-level correction data can be downloaded every time printing is performed. However, the printing time is increased by a period corresponding to the downloading time. Therefore, in this example, the tone-level correction data is stored in the improvement-information storage unit 23 before printing is performed.

When printing is performed, the color converter 251 separates input data corresponding to three primary colors R, G, and B into items and converts these items of input data into items of color-converted data Y, M, C, and K corresponding to the ink colors yellow (Y), magenta (M), cyan (C), and black (K).

Next, the tone-level correction unit 253 refers to the tone-level correction data stored in the improvement-information storage unit 23 and performs correction so that each of print head sections corresponding to Y, M, C, and K can have ideal tone-level characteristics. Items of tone-level-corrected input data are output as tone-level-corrected signals Y'', M'', C'', and K''. Reference to the tone-level correction data can be made for each color or for each head chip.

The halftoning unit 255 performs halftoning processing of the tone-level-corrected signals Y'', M'', C'', and K'' to generate head drive signals Y', M', C', and K' and supplies the head drive signals Y', M', C', and K' to the print head 27.

As a result, tone-level characteristics reproduced on a medium to be recorded can be made closer to ideal irrespective of variations in print characteristics of the print head 27.

(b) Case in which Tone-Level Correction Data is Provided for Each Print Element

The case in which tone-level correction data is provided for individual print elements constituting a print head is described. In this case, print quality can be enhanced since tone-level characteristics can be corrected for each print element.

For example, this case is effective when tone-level reproducing characteristics of specific print elements are different from those of other print elements.

Figure 15:
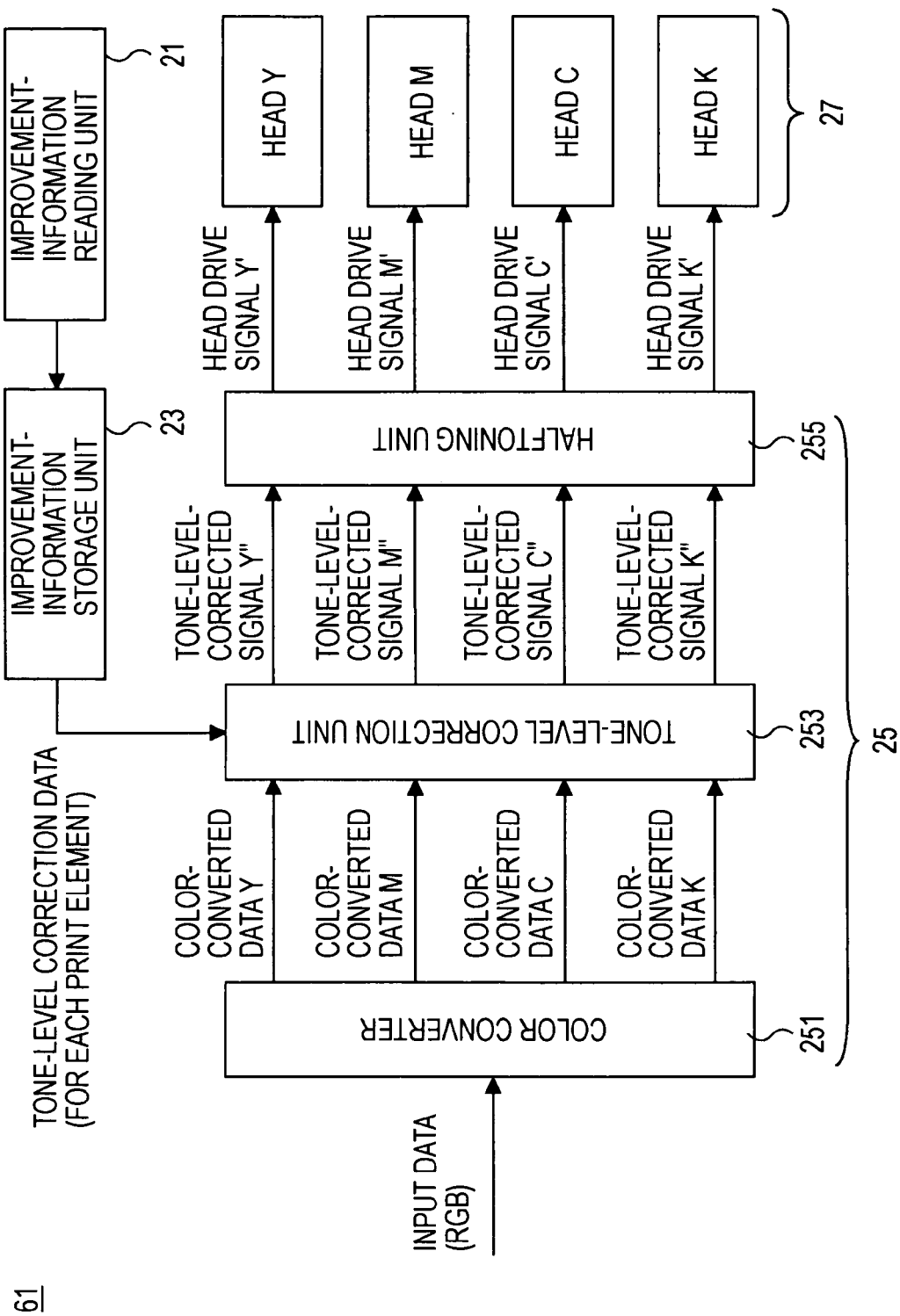
FIG. 15 is a diagram of another exemplary print apparatus using a method of referring to downloaded tone-level correction data.

FIG. 15 illustrates an exemplary print apparatus of this type. A print apparatus 61 shown in FIG. 15 includes the improvement-information reading unit 21, the improvement-information storage unit 23, the print processor 25 (the color converter 251, the tone-level correction unit 253, and the halftoning unit 255), and the print head 27.

In the case of the print apparatus 61, when printing is performed for the first time or when the print head 27 is attached, the improvement-information reading unit 21 reads a serial number of the print head 27 and supplies the serial number to the server 17 via the network 13. Also, the improvement-information reading unit 21 downloads tone-level correction data corresponding to the serial number from the server 17.

The downloaded tone-level correction data is stored in the improvement-information storage unit 23. The tone-level correction data can be downloaded every time printing is performed. However, the printing time is increased by a period corresponding to the downloading time. Therefore, in this example, the tone-level correction data is stored in the improvement-information storage unit 23 before printing is performed.

When printing is performed, the color converter 251 separates input data corresponding to three primary colors R, G, and B into items and converts these items of input data into items of color-converted data Y, M, C, and K corresponding to the ink colors yellow (Y), magenta (M), cyan (C), and black (K).

Next, the tone-level correction unit 253 refers to the tone-level correction data stored in the improvement-information storage unit 23 and performs correction so that the color-converted data corresponding to each print element can have ideal tone-level characteristics. Items of tone-level-corrected input data are output as tone-level-corrected signals Y", M", C", and K". Reference to the tone-level correction data can be made for each print element.

The halftoning unit 255 performs halftoning processing of the tone-level-corrected signals Y", M", C", and K" to generate head drive signals Y', M', C', and K' and supplies the head drive signals Y', M', C', and K' to the print head 27.

As a result, tone-level characteristics reproduced on a medium to be recorded can be made closer to ideal irrespective of variations in print characteristics among the individual print elements constituting the print head 27.

(c) Case in which Tone-Level Correction Data is Provided for Each Column of Pixels In the case where one pixel or one column of pixels is printed by one print element, tone-level characteristics may be corrected for each print element, as has been described above.

However, in the case where one column of pixels is printed by a plurality of print elements, it is necessary to separate correction information into a plurality of items for associated print elements and to apply the separate items of information, and the processing thus becomes complicated. In such a case, the processing can be simplified by performing tone-level correction for each column of pixels, instead of performing tone-level correction for each print element.

In particular, in the case of a line-type print head in which the direction in which ink droplets are ejected can be changed to a plurality of directions, if the positions of pixels in an effective print region are fixed, so are the print elements to be used. Thus, when tone-level correction is made to color-converted data for each column of pixels, the correction result can be applied to a plurality of print elements.

Figure 16:
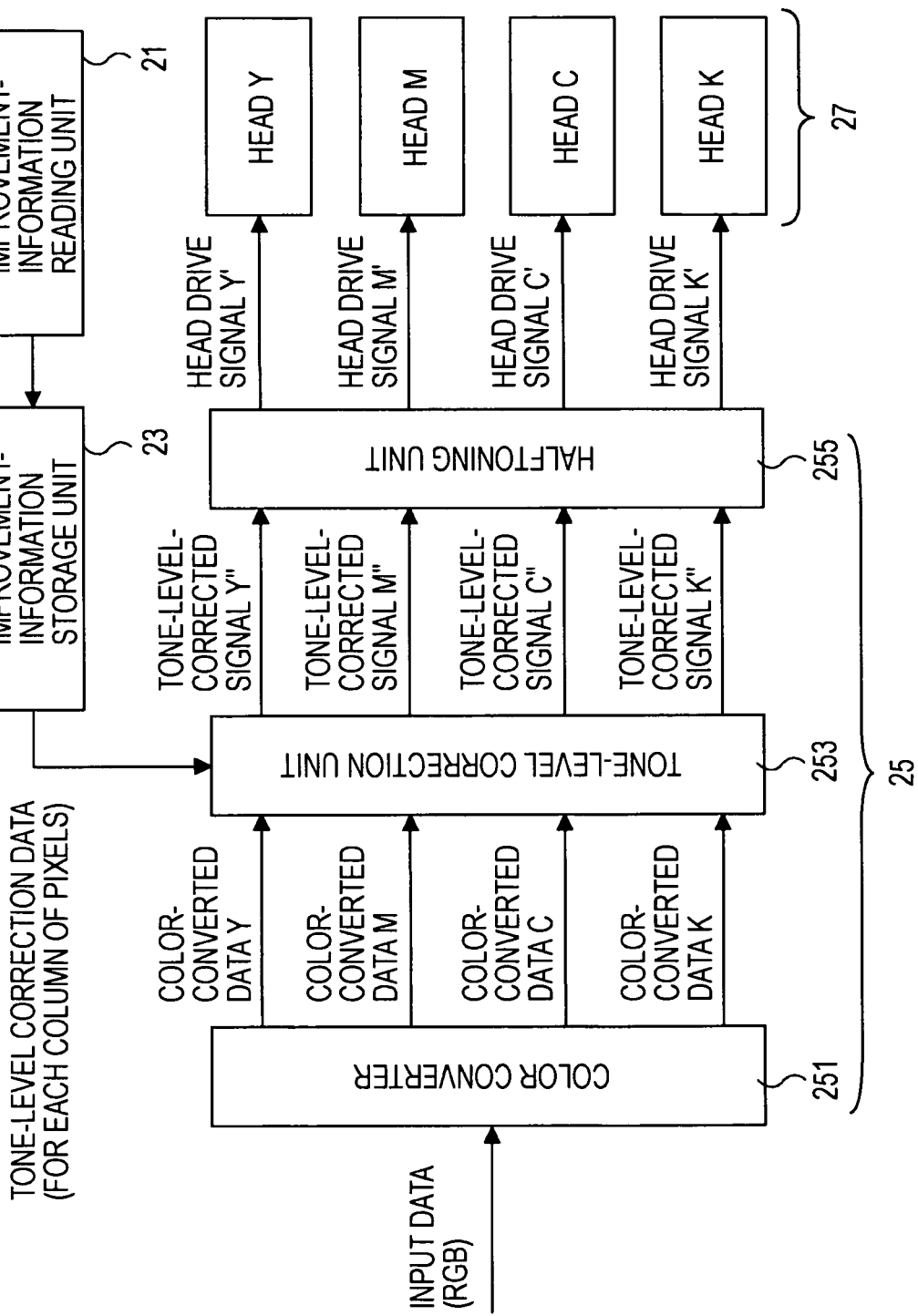
FIG. 16 is a diagram of another exemplary print apparatus using a method of referring to downloaded tone-level correction data.

FIG. 16 illustrates an exemplary print apparatus of this type. A print apparatus 71 shown in FIG. 16 includes the improvement-information reading unit 21, the improvement-information storage unit 23, the print processor 25 (the color converter 251, the tone-level correction unit 253, and the halftoning unit 255), and the print head 27.

In the case of the print apparatus 71, when printing is performed for the first time or when the print head 27 is attached, the improvement-information reading unit 21 reads a serial number of the print head 27 and supplies the serial number to the server 17 via the network 13. Also, the improvement-information reading unit 21 downloads tone-level correction data corresponding to the serial number from the server 17.

The downloaded tone-level correction data is stored in the improvement-information storage unit 23. The tone-level correction data can be downloaded every time printing is performed. However, the printing time is increased by a period corresponding to the downloading time. Therefore, in this example, the tone-level correction data is stored in the improvement-information storage unit 23 before printing is performed.

When printing is performed, the color converter 251 separates input data corresponding to three primary colors R, G, and B into items and converts these items of input data into items of color-converted data Y, M, C, and K corresponding to the ink colors yellow (Y), magenta (M), cyan (C), and black (K).

Next, the tone-level correction unit 253 refers to the tone-level correction data stored in the improvement-information storage unit 23 and performs correction so that each column of pixels can have ideal tone-level characteristics. Items of tone-level-corrected input data are output as tone-level-corrected signals Y", M", C", and K". Reference to the tone-level correction data can be made for each column of pixels.

The halftoning unit 255 performs halftoning processing of the tone-level-corrected signals Y", M", C", and K" to generate head drive signals Y', M', C', and K' and supplies the head drive signals Y', M', C', and K' to the print head 27.

As a result, tone-level characteristics reproduced on a medium to be recorded can be made closer to ideal irrespective of variations in print characteristics among the individual print elements constituting the print head 27.

(B-2) Example of Downloading Error-Diffusion Boundary-Value Data

The foregoing description concerns methods of correcting, in order to improve head characteristics, tone levels of input data using tone-level correction curve data and making tone-level characteristics on a printed matter closer to ideal. However, when correction is made using a tone-level correction curve, the number of actual tone levels is reduced.

In order to overcome this problem, the inventor has proposed a method in Japanese Unexamined Patent Application Publication No. 2005-252633. This method is for a print apparatus that can output three to eight levels using one pixel by performing pulse-width modulation, power modulation, or modulation of the number of times discharging is performed in one pixel. Using this method, boundary values for multilevel error diffusion (error-diffusion boundary-value data) can be optimized so that the print result can be on an ideal tone-level characteristic curve.

When this method is used, the relationship between an input signal and an image density can be made closer to ideal without a significant reduction in the number of tone levels. Tone-level characteristics between boundary values may be displaced more or less from the ideal characteristic curve. Therefore, the actual print system may additionally use a tone-level correction unit in order to adjust such displacement.

Boundary values for multilevel error diffusion (hereinafter referred to as error-diffusion boundary-value data) to be optimized may be provided, for example, for each print head, for each print element, for each column of pixels, or for each ink color.

The following methods for setting error-diffusion boundary-value data to be optimized can be performed: a method of downloading error-diffusion boundary-value data from the server 17 and setting the downloaded error-diffusion boundary-value data in the print apparatus; a method of downloading information for selecting or determining error-diffusion boundary-value data from the server 17 and setting a pair of boundary values on the basis of the downloaded information in the print apparatus; and a method of downloading information for selecting or determining the number of boundary values constituting error-diffusion boundary-value data from the server 17 and setting error-diffusion boundary-value data on the basis of the downloaded information in the print apparatus.

Figure 17:
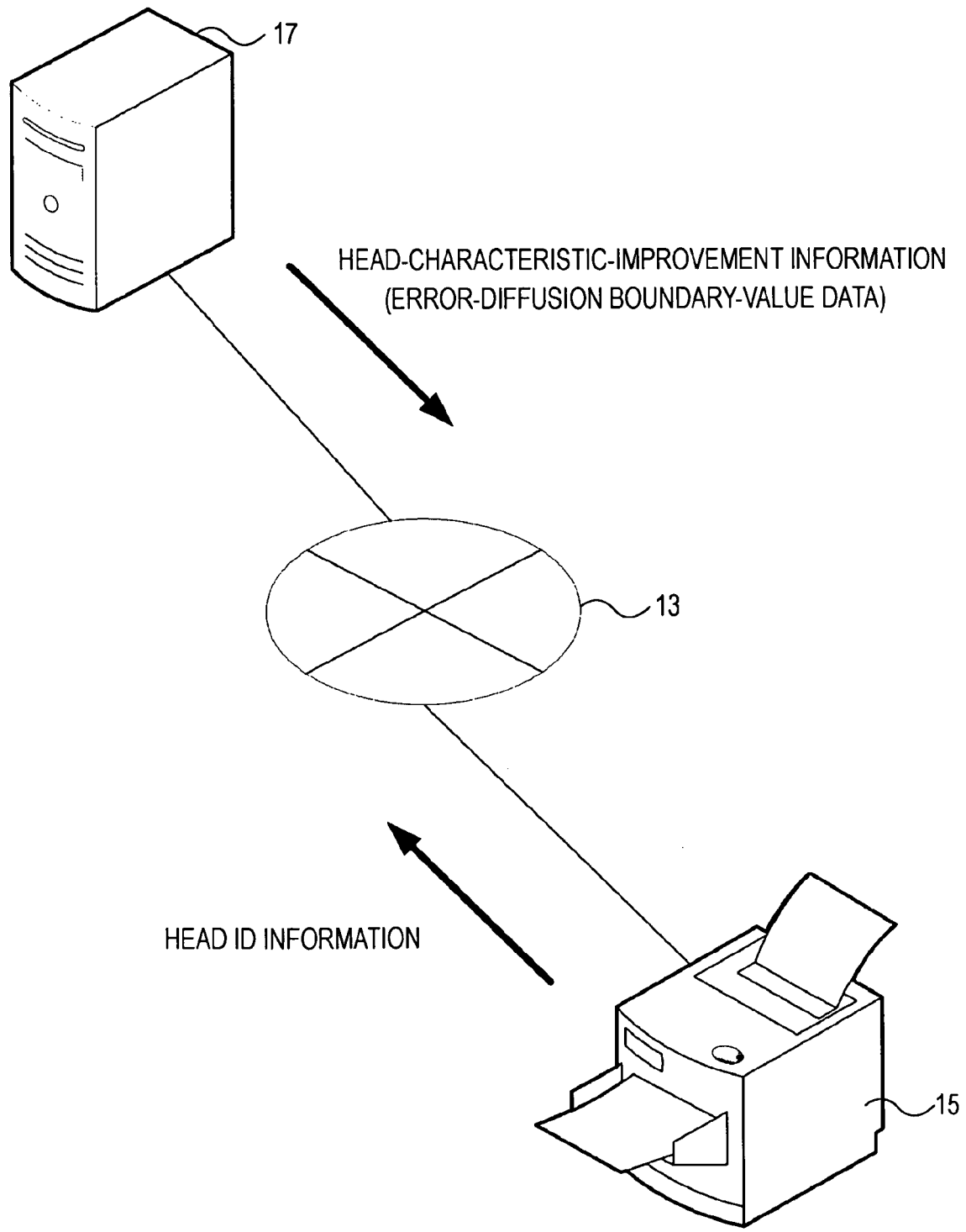
FIG. 17 is an illustration of an example in which error-diffusion boundary-value data is downloaded.

The following description concerns the case where any of the foregoing items of error-diffusion boundary-value data is provided as head-characteristic-improvement information. FIG. 17 is an illustration of this exemplary case. That is, the case where the server 17 sends error-diffusion boundary-value data corresponding to head ID information to the print apparatus 15 is described below.

(a) Case in which Error-Diffusion Boundary-Value Data is Provided for Each Print Head (Part 1)

The case in which error-diffusion boundary-value data is provided for each print head is described. In this example, there are cases where error-diffusion boundary-value data is provided for each color and for each head chip.

Figure 18:
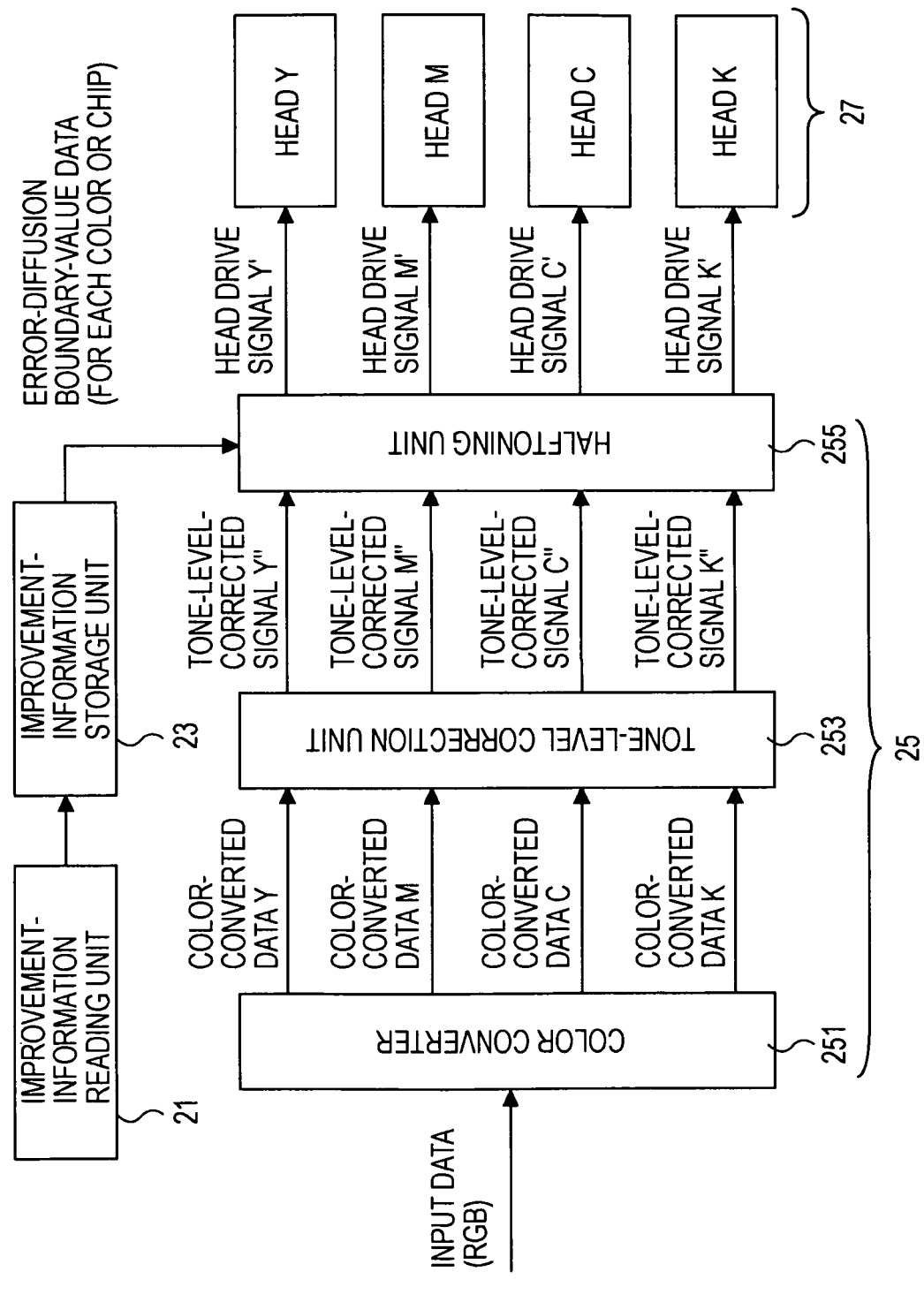
FIG. 18 is a diagram of an exemplary print apparatus using a method of referring to downloaded error-diffusion boundary-value data.

FIG. 18 illustrates an exemplary print apparatus of this type. A print apparatus 81 shown in FIG. 18 includes the improvement-information reading unit 21, the improvement-information storage unit 23, the print processor 25 (the color converter 251, the tone-level correction unit 253, and the halftoning unit 255), and the print head 27.

In the case of the print apparatus 81, when printing is performed for the first time or when the print head 27 is attached, the improvement-information reading unit 21 reads a serial number of the print head 27 and supplies the serial number to the server 17 via the network 13. Also, the improvement-information reading unit 21 downloads error-diffusion boundary-value data corresponding to the serial number from the server 17.

The downloaded error-diffusion boundary-value data is stored in the improvement-information storage unit 23. The error-diffusion boundary-value data can be downloaded every time printing is performed. However, the printing time is increased by a period corresponding to the downloading time. Therefore, in this example, the error-diffusion boundary-value data is stored in the improvement-information storage unit 23 before printing is performed.

When printing is performed, the color converter 251 separates input data corresponding to three primary colors R, G, and B into items and converts these items of input data into items of color-converted data Y, M, C, and K corresponding to the ink colors yellow (Y), magenta (M), cyan (C), and black (K).

Next, the tone-level correction unit 253 performs correction according to a conversion condition set at the time of shipment or the like so that tone-level characteristics of the input data can be made ideal. Items of tone-level-corrected input data are output as tone-level-corrected signals Y", M", C", and K". Reference to the error-diffusion boundary-value data can be made for each color or for each head chip.

The halftoning unit 255 refers to the error-diffusion boundary-value data stored in the improvement-information storage unit 23 and performs error diffusion processing so that each of print head sections corresponding to Y, M, C, and K can have ideal tone-level characteristics.

That is, the halftoning unit 255 performs halftoning processing of the tone-level-corrected signals Y", M", C", and K" to generate head drive signals Y', M', C', and K' and supplies the head drive signals Y', M', C', and K' to the print head 27.

As a result, tone-level characteristics reproduced on a medium to be recorded can be made closer to ideal irrespective of variations in print characteristics of the print head 27.

Alternatively, a method of processing, using the halftoning unit 255 instead of the tone-level correction unit 253, the items of color-converted data Y, M, C, and K obtained by the color converter 251 may be used.

Figure 19A:
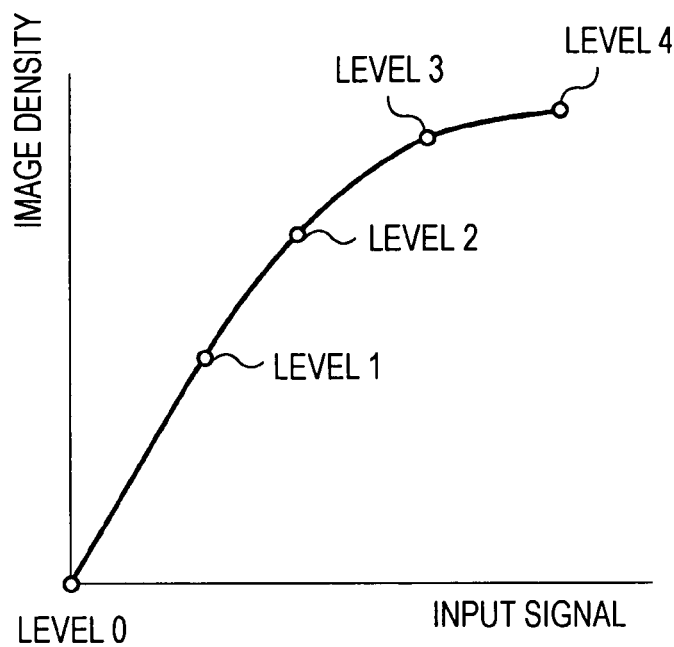
FIGS. 19A and 19B are illustrations of changes in image-density reproduction characteristics due to changes in a boundary-value table.
Figure 19B:
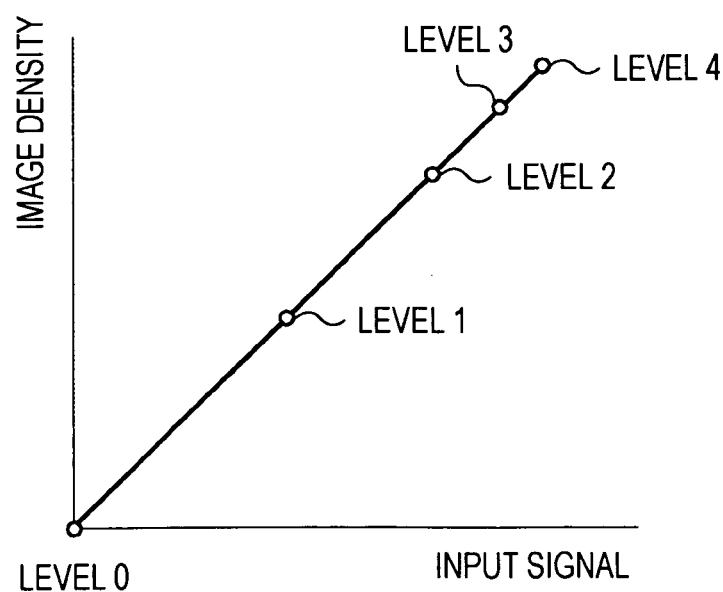

FIGS. 19A and 19B are illustrations of changes in image density due to changes in a boundary-value table. FIGS. 19A and 19B illustrate the relationship in the case where, when one pixel is printable at five levels (not printed (level 0), printed at level 1, printed at level 2, printed at level 3, and printed at level 4), an input signal is multilevel-error-diffused into one of these five levels.

Referring to FIG. 19A, in the case where an input signal takes 0 to 255, when the input signal is 0, no printing is performed; when the input signal is 64, printing is performed at level 1; when the input signal is 128, printing is performed at level 2; when the input signal is 196, printing is performed at level 3; and when the input signal is 255, printing is performed at level 4. When the input signal is between 1 and 63, no printing is performed or printing is performed at level 1; when the input signal is a value within the range of 65 to 127, printing is performed at level 1 or level 2; when the input signal is a value within the range of 129 and 195, printing is performed at level 2 or level 3; and when the input signal is a value within the range of 197 and 254, printing is performed at level 3 or level 4. Boundary values are set in this manner, and multilevel error diffusion is performed. In such a case, the relationship between the input signal and the density is illustrated in FIG. 19A.

In this case, for example, 64 at which printing is performed at level 1 or 128 at which printing is performed at level 2 is referred to as a boundary value for error diffusion since this value defines the boundary where the range of multilevel error diffusion is changed. If the relationship between the input signal and the density is ideal when the input signal and the density are in direct proportion, the boundary value table is optimized in accordance with the tone-level characteristics of the print head. Referring now to FIG. 19B, the tone-level characteristics are corrected and made substantially ideal without reducing the number of tone levels.

The error-diffusion boundary-value data to be downloaded may be sent to the print apparatus 15 as a boundary value table corresponding to one pair of boundary values or sent to the print apparatus 15 as data for selecting or determining an optimal boundary value table from among a plurality of boundary value tables prepared in advance in the print apparatus 15.

For example, when table data (data in which selection information is associated with a boundary value table) shown in FIG. 20 is stored in advance in the print apparatus 15, the selection information is sent.

When table data (data in which determination information is associated with a boundary value table) shown in FIG. 21 is stored in advance in the print apparatus 15, the determination information is sent. FIG. 21 illustrates an example in which an average nozzle diameter of the print head 27 is used as the determination information.

(b) Case in which Error-Diffusion Boundary-Value Data is Provided for Each Print Head (Part 2)

The foregoing description concerns cases where a reproduced tone-level curve is optimized by changing a combination of boundary values.

However, if there are variations in highest density among print heads, the tone-level curve is difficult to be made closer to ideal simply by changing the boundary values.

Figure 22:
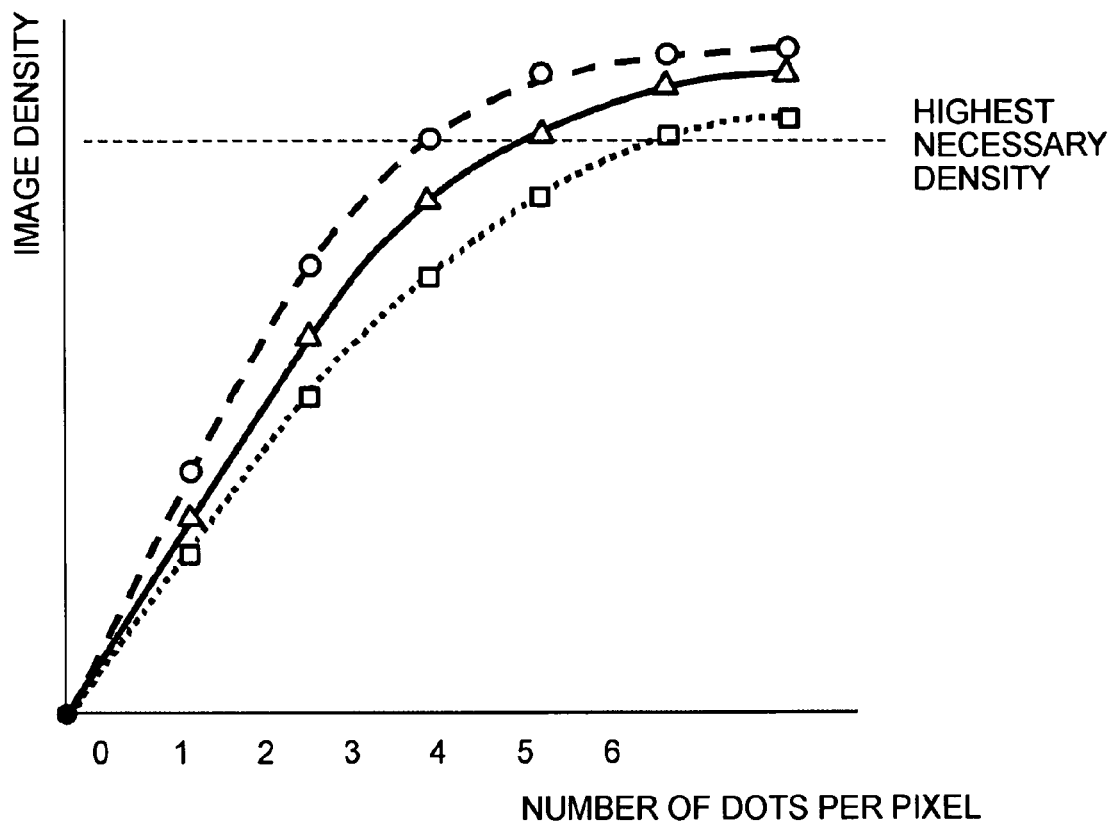
FIG. 22 is a graph illustrating variations in highest density among print heads.

FIG. 22 illustrates exemplary variations in highest density.

Referring to FIG. 22, in the case of print head A, a highest necessary density is achieved by using three dots. In contrast, in the case of print head B, a highest necessary density is achieved by using five dots. In the case of print head C, a highest necessary density is achieved by using four dots. These differences in density characteristics are caused by, for example, differences in nozzle diameter or differences in dot diameter due to variations in ejection output.

With the foregoing characteristics, even when the boundary values for error diffusion are simply optimized, density characteristics near the highest density may greatly vary. Therefore, the boundary values are set by changing the number of boundary values so that each print head has the same or similar density characteristics.

For example, for print head A shown in FIG. 22, boundary values for error diffusion are set to four values including 0, 138, 212, and 255. For print head B shown in FIG. 22, boundary values for error diffusion are set to six values including 0, 76, 134, 182, 224, and 255.

Similarly, for print head C shown in FIG. 22, boundary values for error diffusion are set to five values including 0, 100, 169, 220, and 255.

Figure 23:
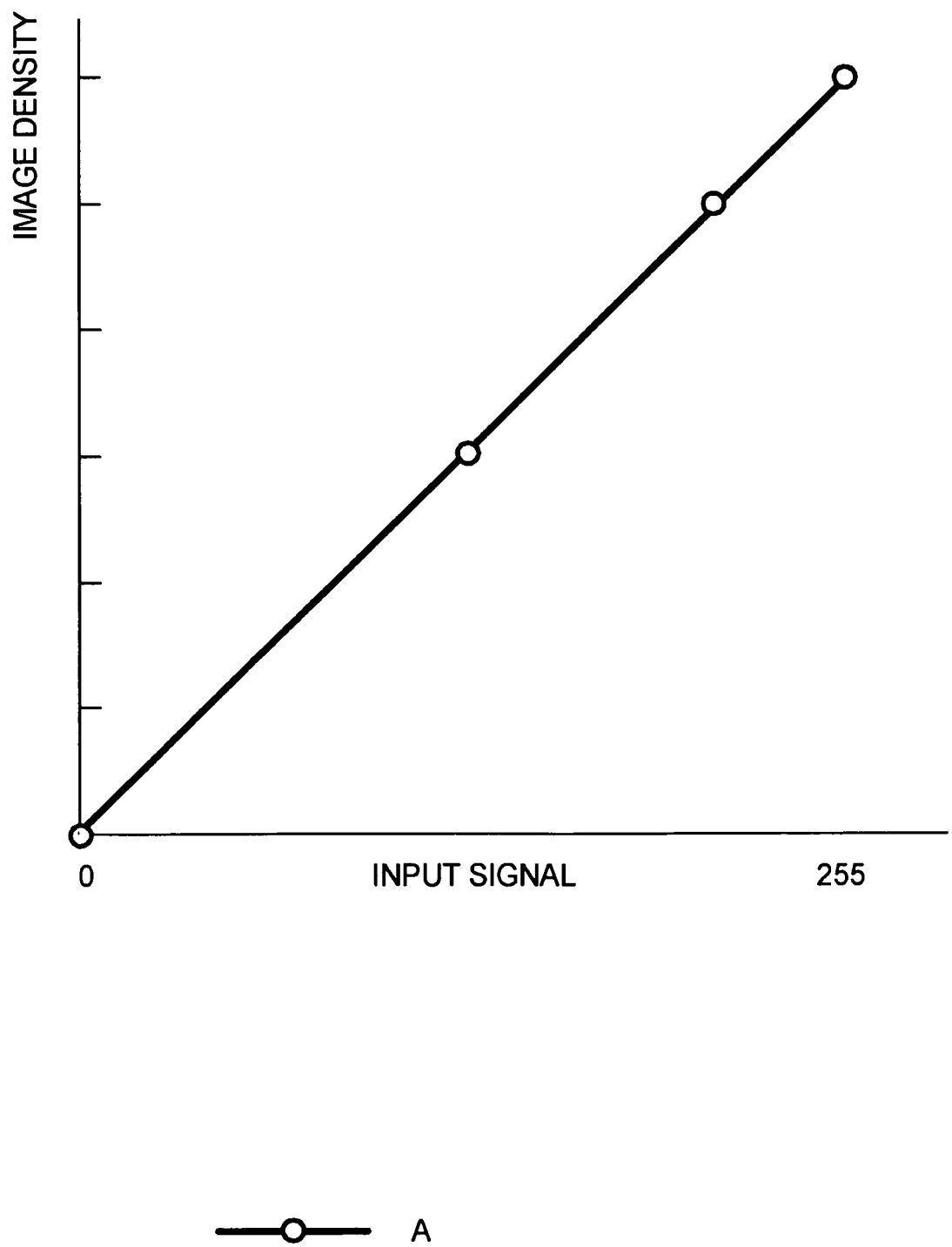
FIG. 23 is a graph illustrating an example in which boundary values are set according to the highest density (the number of boundary values=4)
Figure 24:
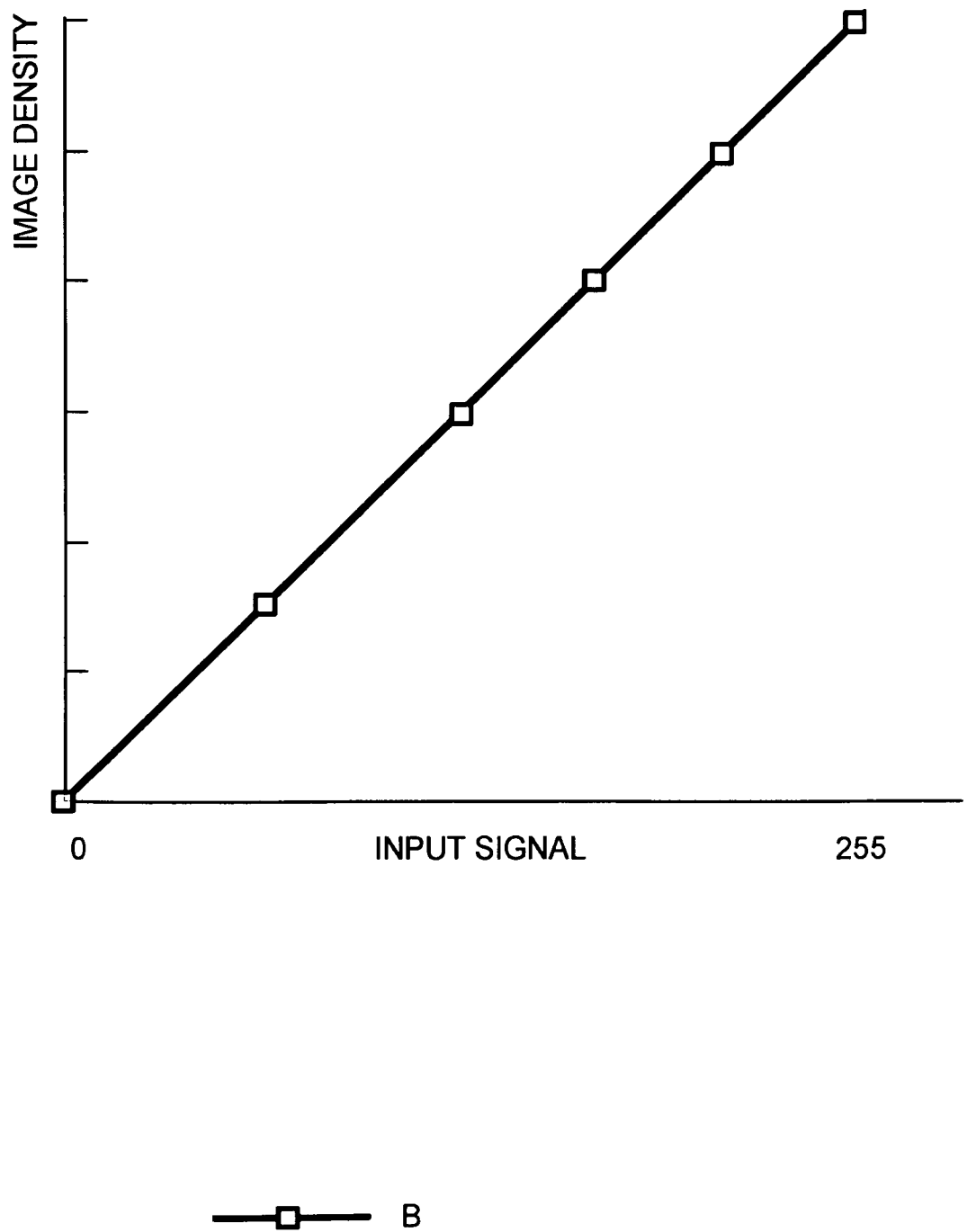
FIG. 24 is a graph illustrating an example in which boundary values are set according to the highest density (the number of boundary values=6)
Figure 25:
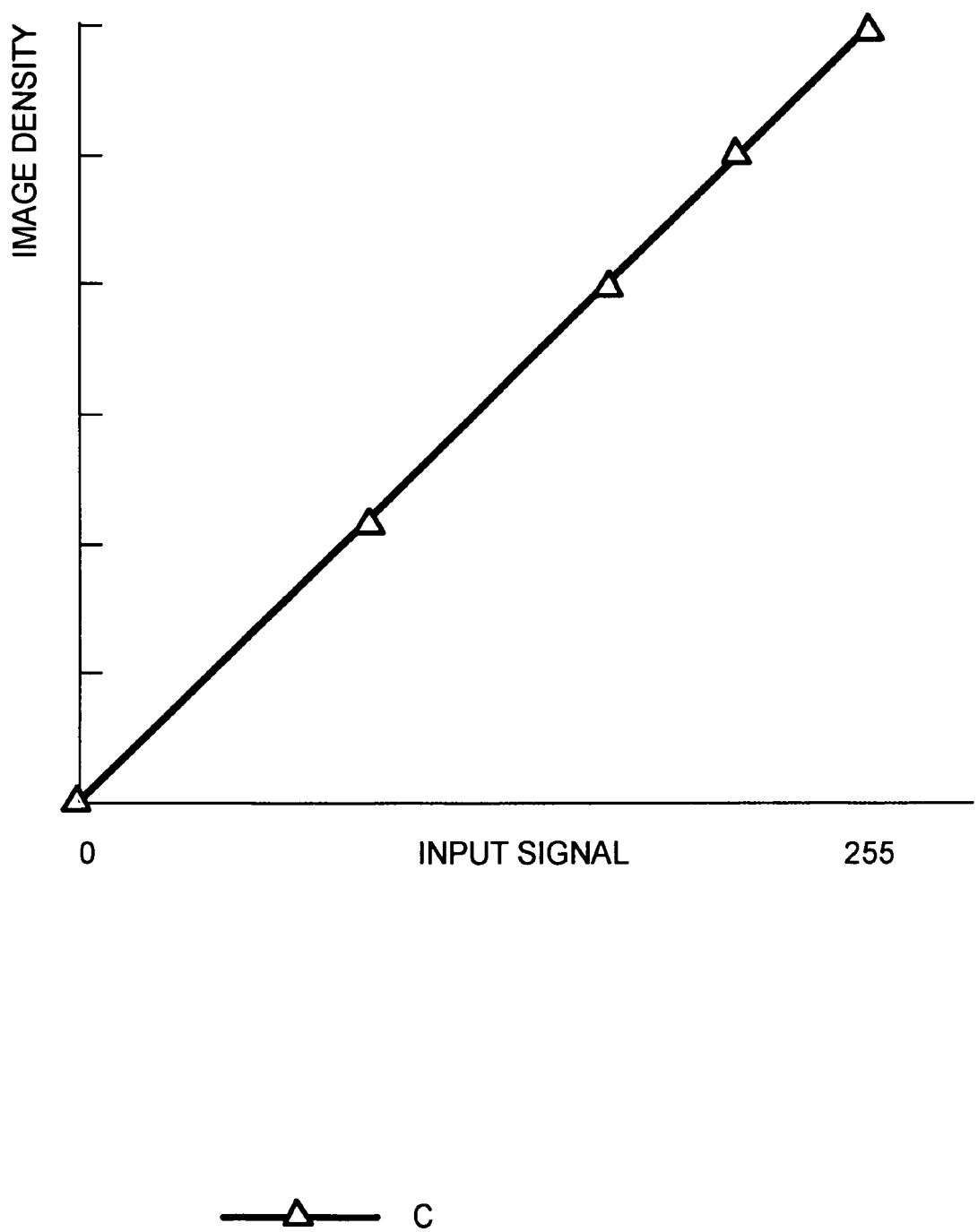
FIG. 25 is a graph illustrating an example in which boundary values are set according to the highest density (the number of boundary values=5)

In this case, the image density of each print head with respect to input data is illustrated in FIGS. 23, 24, and 25.

When the boundary values for error diffusion are determined in this manner, any print head can achieve ideal tone-level characteristics.

FIGS. 23 to 25 illustrate ideal tone-level characteristics as if they are arranged along a straight line. However, the tone-level characteristics may be arranged along a curve. A setting may be performed so that boundary-value data can be on this ideal curve.

When the boundary values for error diffusion are set to any values in the foregoing manner, the computational complexity involved in performing multilevel error diffusion processing is increased, and hence the processing time is also increased.

However, referring now to FIGS. 26 to 28, when thresholds, boundary values, and output values corresponding to input data values are summarized in a table, the computational or processing complexity can be reduced.

A threshold is used as a determination reference for a value (input value) obtained by adding an error component of a peripheral pixel to an input signal value.

A boundary value L is a boundary value assigned when the input value is less than the determination threshold. A boundary value H is a boundary value assigned when the input value is greater than the determination threshold.

An output value L is the number of dots (quantized value) assigned when the input value is less than the determination threshold. An output value H is the number of dots (quantized value) assigned when the input value is greater than the determination threshold.

By optimizing the error-diffusion boundary-value data in the foregoing manner, the tone-level characteristics can be on a characteristic curve and can be made closer to ideal in which there are fewer variations in highest density.

(B-3) Example of Downloading Head-Drive-Signal Correction Data

Figure 29:
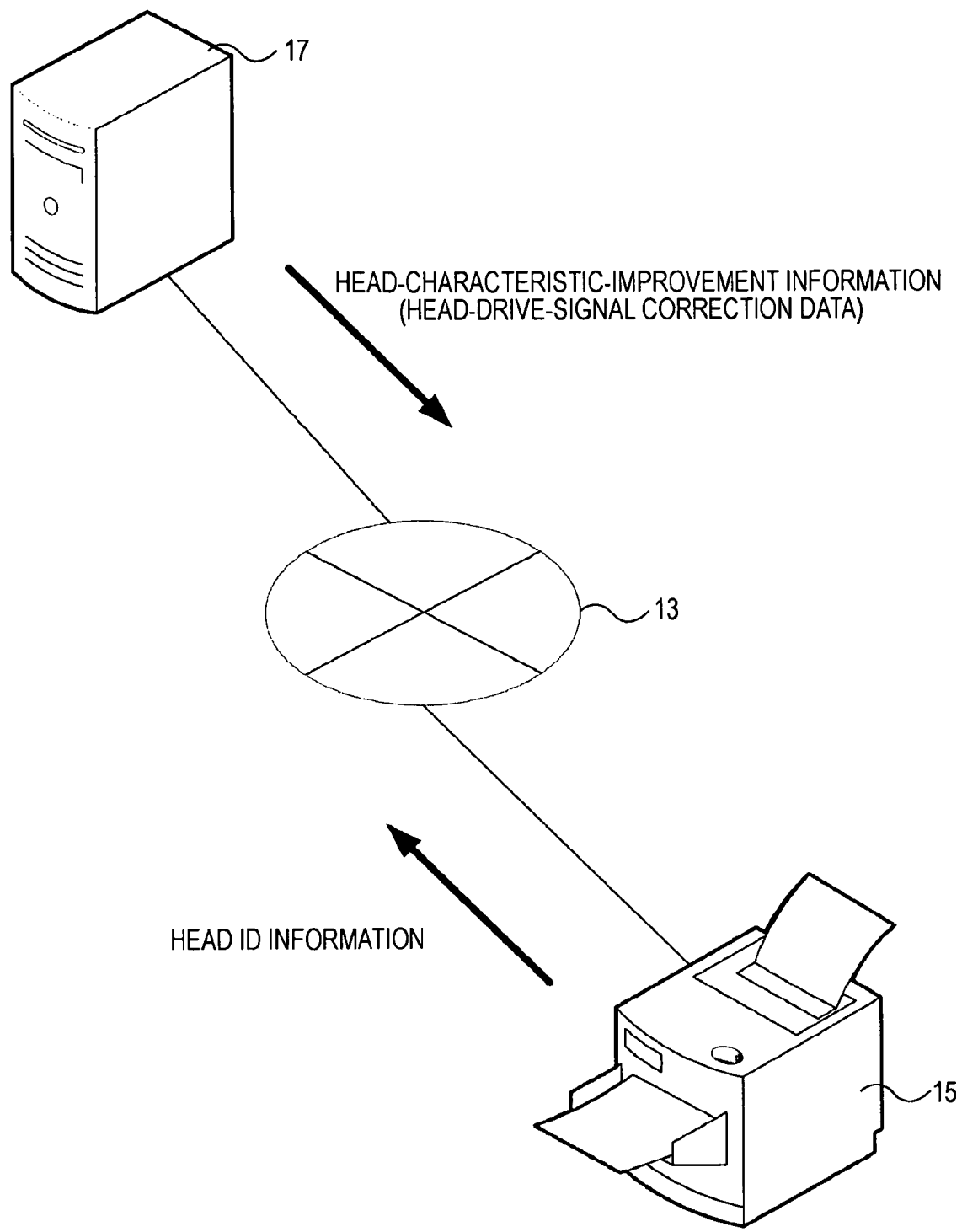
FIG. 29 is an illustration of an example in which head-drive-signal correction data is downloaded.

The following description concerns the case where data for correcting halftone-processed head drive signals is downloaded as head-characteristic-improvement information. FIG. 29 is an illustration of this exemplary case. That is, the case where the server 17 sends head-drive-signal correction data corresponding to head ID information to the print apparatus 15 is described below.

Figure 30:
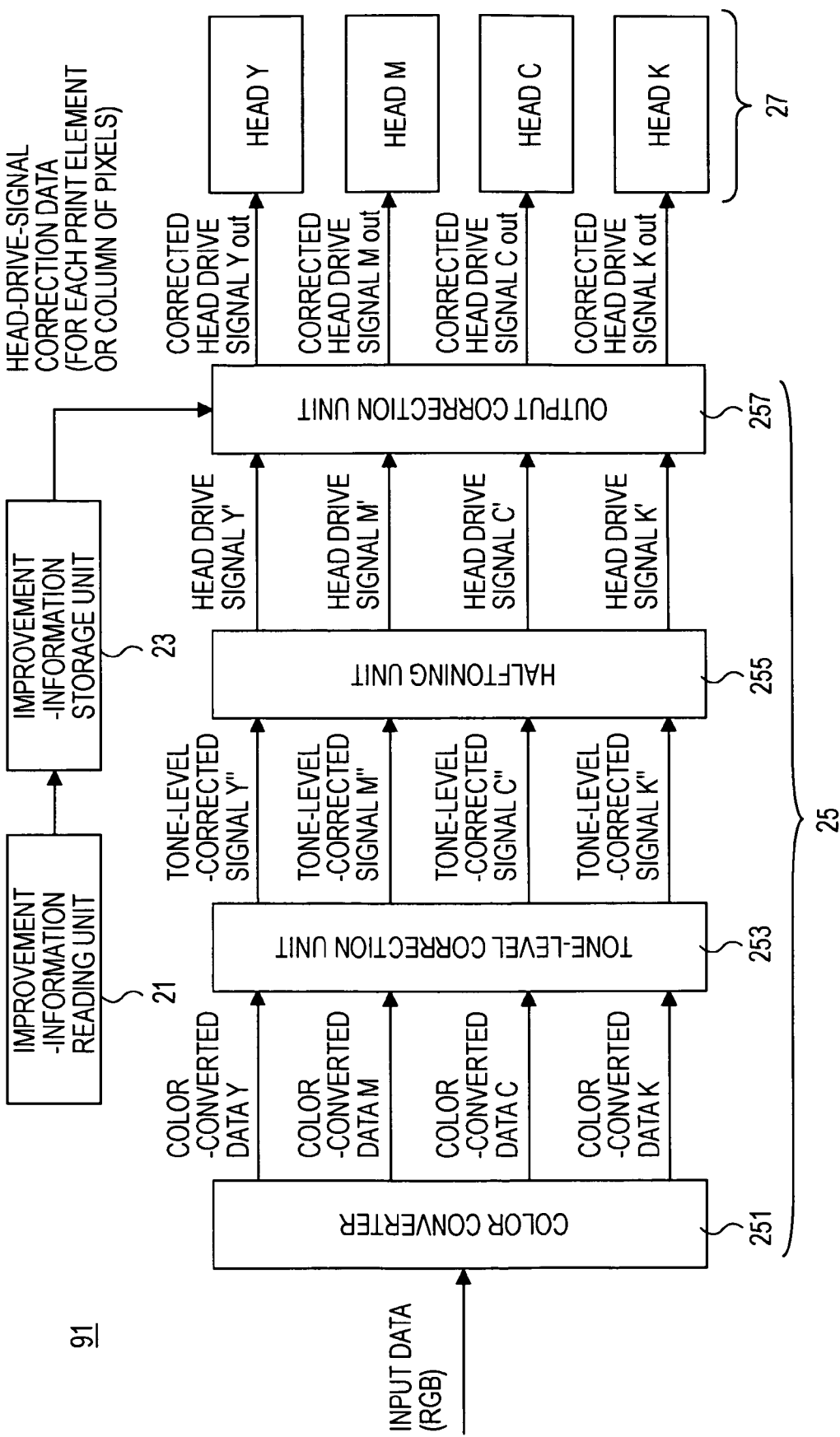
FIG. 30 is a diagram of an exemplary print apparatus using a method of referring to downloaded head-drive-signal correction data.

(a) Case in which Head-Drive-Signal Correction Data is Provided for Each Print Element or for Each Column of Pixels FIG. 30 illustrates an exemplary print apparatus of this type. A print apparatus 91 shown in FIG. 30 includes the improvement-information reading unit 21, the improvement-information storage unit 23, the print processor 25 (the color converter 251, the tone-level correction unit 253, the halftoning unit 255, and an output correction unit 257), and the print head 27.

In the case of the print apparatus 91, when printing is performed for the first time or when the print head 27 is attached, the improvement-information reading unit 21 reads a serial number of the print head 27 and supplies the serial number to the server 17 via the network 13. Also, the improvement-information reading unit 21 downloads head-drive-signal correction data corresponding to the serial number from the server 17.

The downloaded head-drive-signal correction data is stored in the improvement-information storage unit 23. The head-drive-signal correction data can be downloaded every time printing is performed. However, the printing time is increased by a period corresponding to the downloading time. Therefore, in this example, the head-drive-signal correction data is stored in the improvement-information storage unit 23 before printing is performed.

When printing is performed, the color converter 251 separates input data corresponding to three primary colors R, G, and B into items and converts these items of input data into items of color-converted data Y, M, C, and K corresponding to the ink colors yellow (Y), magenta (M), cyan (C), and black (K).

Next, the tone-level correction unit 253 performs correction according to a conversion condition set at the time of shipment or the like so that tone-level characteristics of the input data can be made closer to ideal. Items of tone-level-corrected input data are output as tone-level-corrected signals Y", M", C", and K". Reference to the head-drive-signal correction data can be made for each color or for each head chip.

The halftoning unit 255 performs halftoning processing of the tone-level-corrected signals Y", M", C", and K" to generate head drive signals Y', M', C', and K' and supplies the head drive signals Y', M', C', and K' to the output correction unit 257.

The output correction unit 257 reads the head-drive-signal correction data, which has been set for each print element or for each column of pixels, corrects the head drive signals Y', M', C', and K', and outputs corrected head drive signals Yout, Mout, Cout, and Kout to the print head 27.

As a result, tone-level characteristics reproduced on a medium to be recorded can be made closer to ideal irrespective of variations in print characteristics of the print head 27.

A specific example is described below. In this example, a head drive signal sequence corresponding to a certain column of pixels is provided as 3, 3, 3, 3, 3, 3, 3, 3, 3, and 3.

The head is assumed to perform printing with a higher density as the value of the head drive signal becomes greater. That is, when the head drive signal is 0, the head does not perform printing of that pixel. When the head drive signal is 1, the head performs printing at level 1. When the head drive signal is 2, the head performs printing at level 2. When the head drive signal is 3, the head performs printing at level 3.

As a method of increasing the density, in the case of an inkjet print apparatus, a method of increasing the number of droplets discharged in that pixel, a method of changing the size of droplets, or a method of changing the density of droplets can be used. In the case of a thermal transfer print apparatus, there is a method of changing the quantity of heat supply and changing the area where ink is transferred.

In this case, if head-drive-signal correction data corresponding to this column of pixels is set to 1.2 (1 in the case where no correction is performed), the output correction unit 257 calculates a tentative output value on the basis of a conversion equation.

The conversion equation is defined as a function of a pre-corrected output value and correction information as variables. That is, it is defined that the tentative output value=f (pre-corrected output value, correction information) where f(pre-corrected output value, correction information)=pre-corrected output value×correction information.

In this case, the foregoing head drive signal sequence is converted to 3.6, 3.6, 3.6, 3.6, 3.6, 3.6, 3.6, 3.6, 3.6, and 3.6.

In this case, if the print apparatus is capable of printing at level 3.6, printing at level 3.6 is performed.

However, if formation of dots using print elements is performed only step by step, it is necessary for the corrected head drive signal to be an integer.

In this case, pseudo-error-diffusion processing is performed on the tentative output value, thereby generating a corrected head drive signal.

For example, if the threshold is 3.5, the tentative output value exceeds the threshold. Thus, the first head drive signal is converted to 4. To calculate the next head drive signal, the difference between the immediately preceding head drive signal (tentative output value) and the actual output value (−0.4 in this case) is added to the next head drive signal (tentative output value), and this added result is compared with the threshold, thereby obtaining a corrected head drive signal.

More specifically, 3.2 (=3.6+(−0.4)) is compared with the threshold 3.5, thereby converting the second head drive signal to 3.

Thereafter, this processing is continued, and the corrected head drive signal for the same print element or for the same column of pixels is converted to an integer. In the foregoing example, the corrected head drive signal sequence is converted to 4, 3, 4, 3, 4, 4, 3, 4, 3, and 4.

In this description, an error that occurs when pseudo-error-diffusion processing is performed is distributed 100% to the next input head drive signal. Alternatively, ⅔ of the error may be distributed to the next head drive signal, and ⅓ of the error may be distributed to the next head drive signal. That is, weighted error diffusion processing can be performed.

In this description, an error is diffused in the column-of-pixel direction (main scanning direction), and no correlation with other columns of pixels adjacent in the sub-scanning direction is calculated. Thus, shading may occur in similar periods. The appearance of shading may be perceived as unevenness in shading. In order to avoid this unevenness in shading, the scheme of giving an initial error as a random number or the scheme of determining a correction value by taking into consideration circumstances of correction performed for other columns of pixels may be used.

(C) Advantages of Exemplary Cases

As has been described above, the following advantages that are difficult to be achieved in the related art can be achieved by using the mechanism of providing head-characteristic-improvement information from the server to the print apparatus via the network.

First, the manufacturing cost can be reduced since it becomes unnecessary to store head-characteristic-improvement information in individual print heads.

Furthermore, since necessary head-characteristic-improvement information can be stored in the server (the head-characteristic-improvement information can be stored not in the print head, but in a storage area of a main body of the print apparatus), correction can be performed using more detailed information, compared with techniques in the related art where the storage area is restricted.

Since the print head has no storage area for storing head-characteristic-improvement information, failures found in the related art, such as reading failures, information loss, or changes in information, can be avoided.

Since the head-characteristic-improvement information is managed by the server, the situation where it is not identified which information is used by the user to perform correction and printing can be avoided.

As a result, when print characteristics deteriorate or when a failure occurs, the provider of the print apparatus can take more correct measures. For example, when it becomes necessary to modify correction information due to aging or the like, the provider can provide new correction information that suits the problem.

(D) Applications of Print Apparatus

Applications of the print apparatus are discussed below.

The foregoing print apparatus is applicable to products for various applications.

Figure 31:
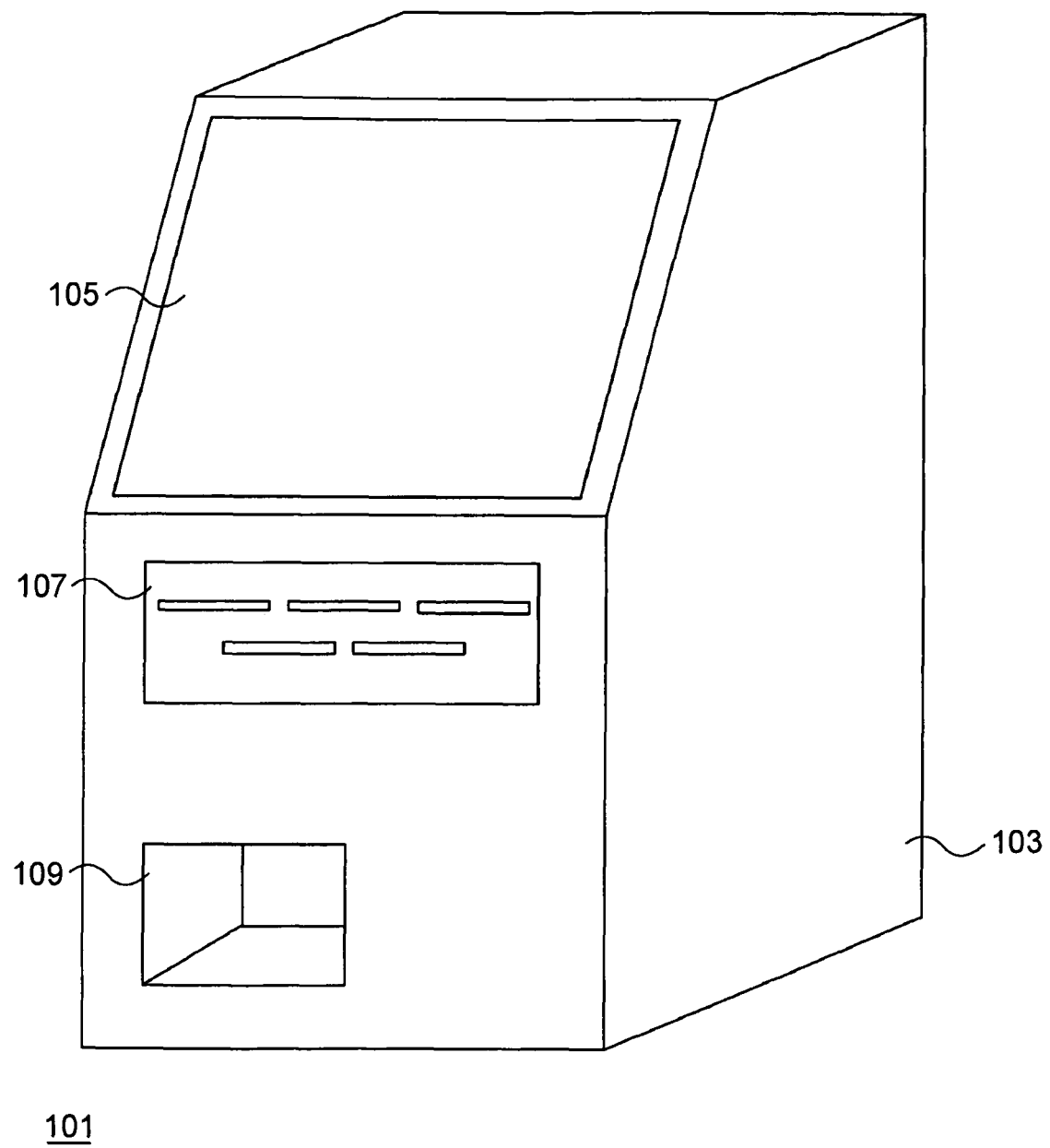
FIG. 31 illustrates an exemplary appearance of a kiosk-type print apparatus.

For example, the above-described print apparatus is applicable to a kiosk-type print apparatus. FIG. 31 illustrates the general appearance of a kiosk-type print apparatus. A print apparatus 101 of this type includes a display region 105 on which instructions can be entered, media insertion slots 107, and a printed-matter ejection slot 109. The display region 105, the media insertion slots 107, and the printed-matter ejection slot 109 are provided on a front side of a housing 103.

Figure 32:
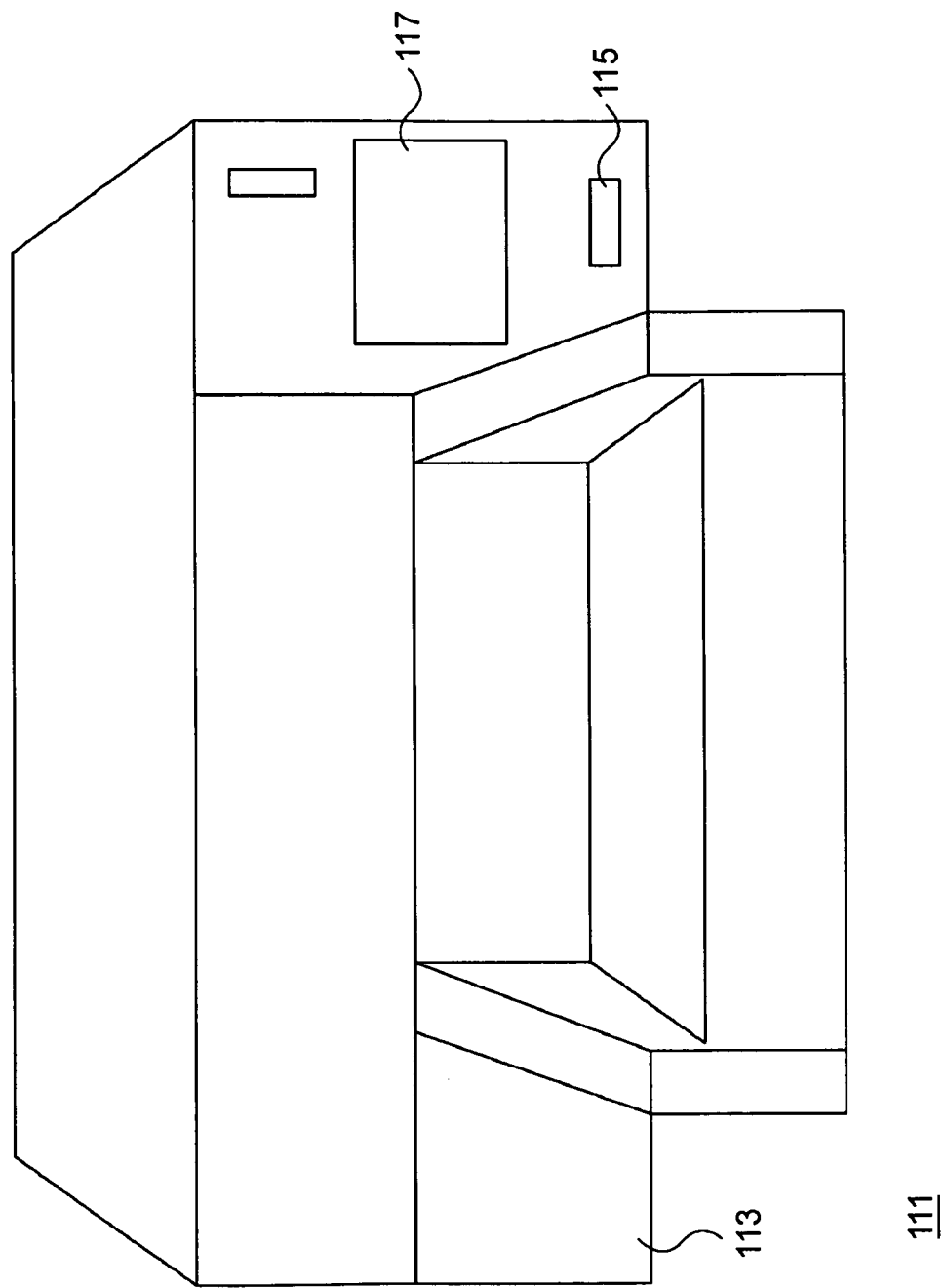
FIG. 32 illustrates an exemplary appearance of a general-purpose print apparatus.

Alternatively, for example, the above-described print apparatus is applicable to a general-purpose print apparatus. FIG. 32 illustrates the general appearance of a print apparatus of this type. A print apparatus 111 of this type includes a medium insertion slot 115 and a display region 117, which are provided on a front side of a housing 113.

Alternatively, for example, the above-described print apparatus is applicable to a print apparatus used for special applications, such as in medical institutions or the like. In the case of a print apparatus used in a medical institution, the print apparatus is used to print a monochrome image, such as an X-ray film, or a color image, such as a magnetic resonance imaging (MRI) image. In particular, the print apparatus proposed by the inventor is capable of reproducing image data without losing almost any tone-level information. In addition, variations in highest density have almost no effect on the print apparatus. Therefore, the print apparatus is expected to provide very high image quality.

Alternatively, the above-described print apparatus is applicable to a print apparatus used to print patterns of color filters constituting display devices or various electronic devices. Even when print characteristics vary, if the provider who manufactured the apparatus manages information for improving the print characteristics, the print characteristics can be improved via a network.

(E) Other Embodiments (a) Combination of Correction for Each Print Head and Correction for Each Print Element or for Each Column of Pixels The foregoing description concerns the cases where correction of print characteristics is performed for each print head and the cases where correction of print characteristics is performed for each print element or for each column of pixels.

Figure 33:
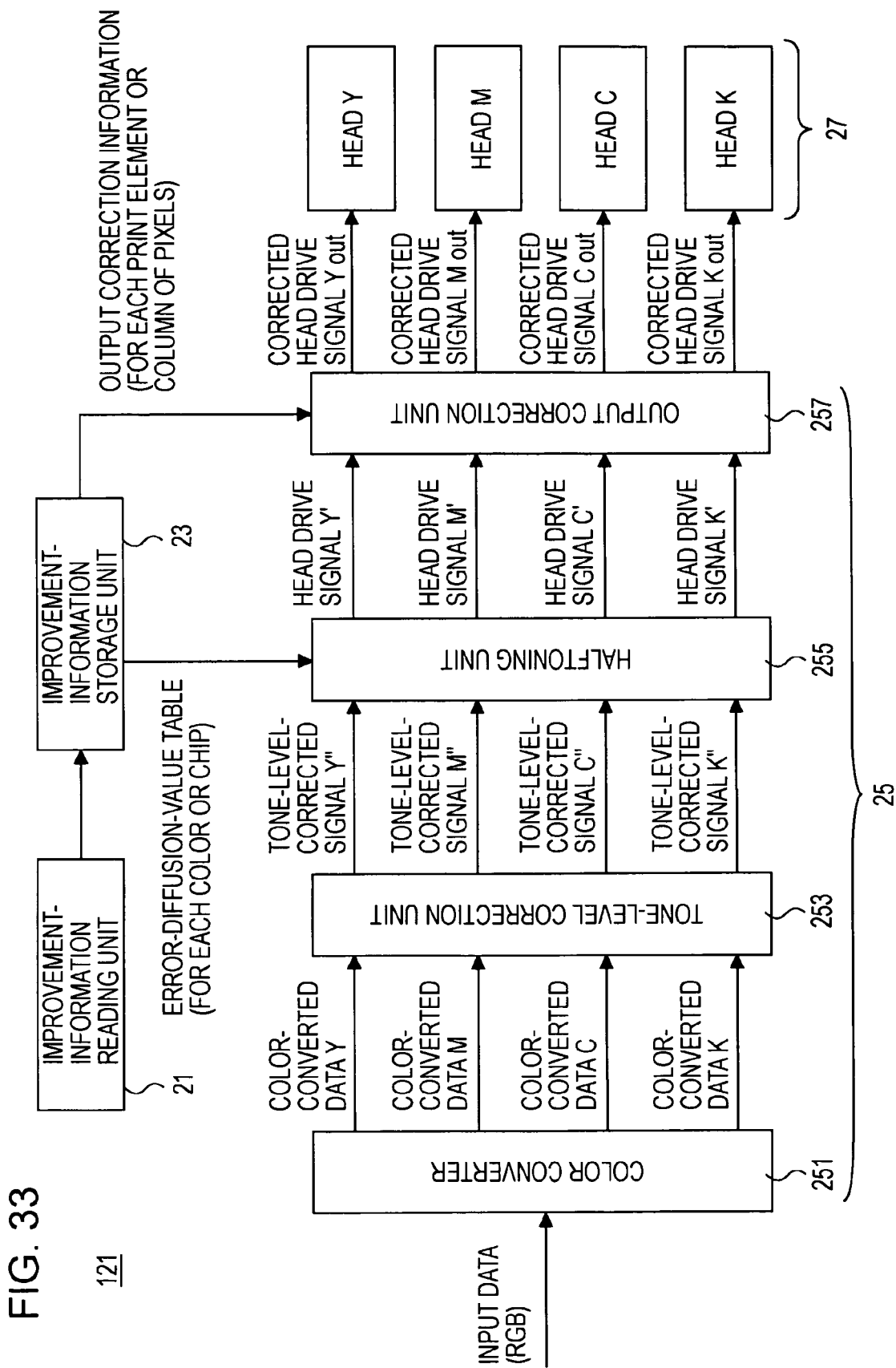
FIG. 33 is a diagram of another exemplary structure of a print apparatus.

However, the above-described print apparatus is applicable to a print apparatus having the two correction functions. FIG. 33 is a diagram of another exemplary structure of a print apparatus. More specifically, the halftoning unit 255 performs correction for each print head, and the output correction unit 257 performs correction for each print element or for each column of pixels.

(b) Updating Head-Characteristic-Improvement Information

The foregoing description concerns the cases where head-characteristics-improvement information that is prepared in advance is basically provided from the server to the print apparatus.

However, a better print result can be achieved by a mechanism that enables updating of the head characteristics at appropriate times even after the start of use.

Figure 34:
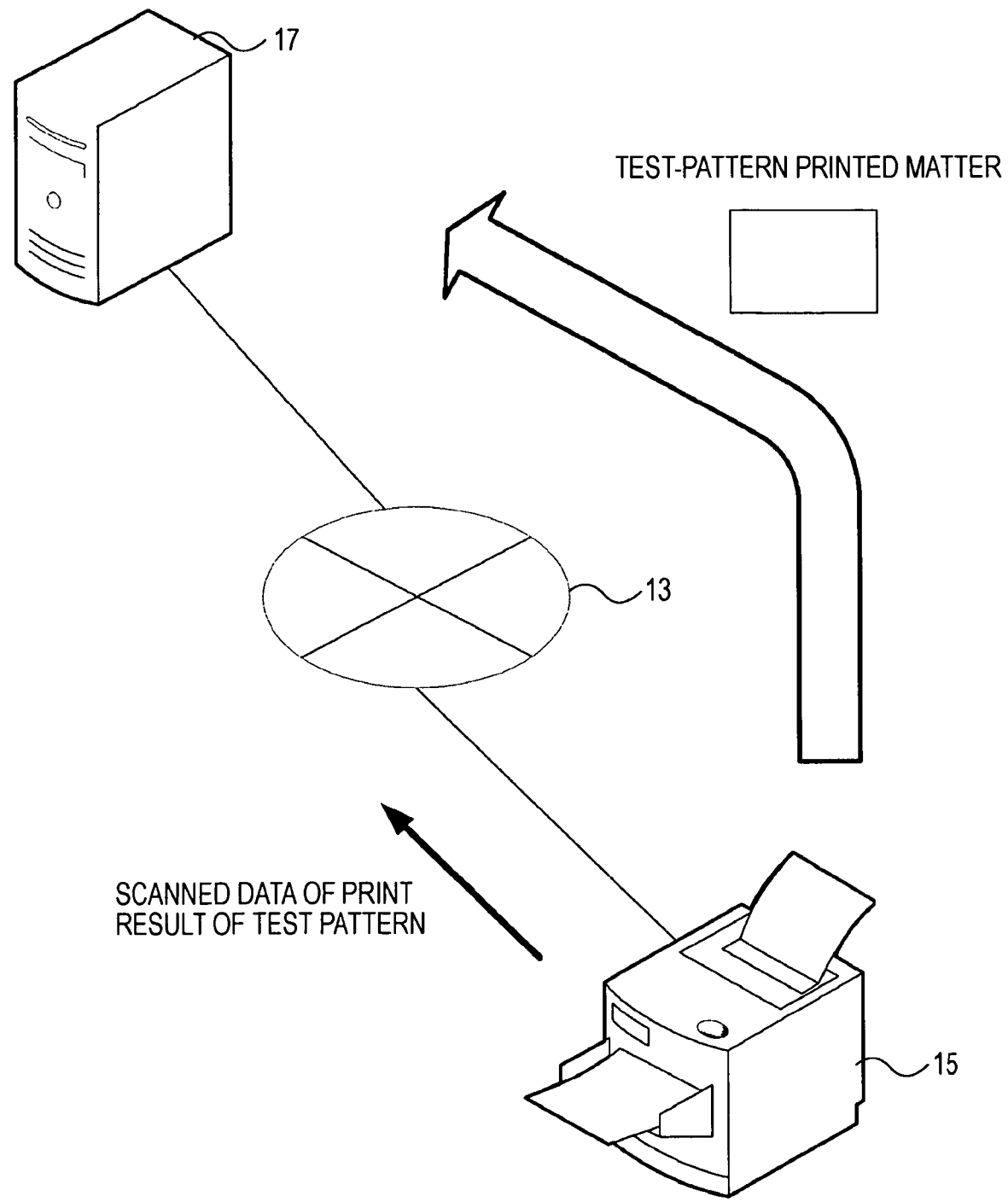
FIG. 34 is a method of notifying the server of a print result of a test pattern.

FIG. 34 illustrates the concept of such a case. As shown in FIG. 34, there are two methods for notifying the server of a print result of a test pattern from the print apparatus. One involves sending a printed matter to the server using a postal service or a delivery service. The other involves sending data obtained by scanning a printed matter to the server via a network.

Figure 35A:
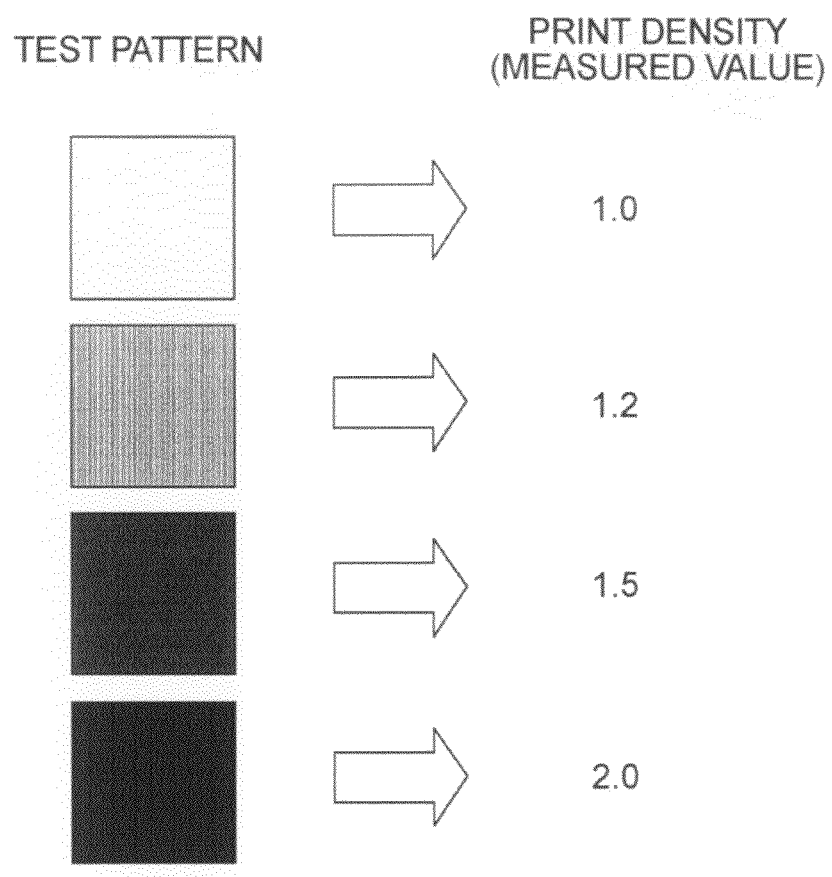
FIGS. 35A and 35B are illustrations of the relationship between test patterns and print densities.
Figure 35B:
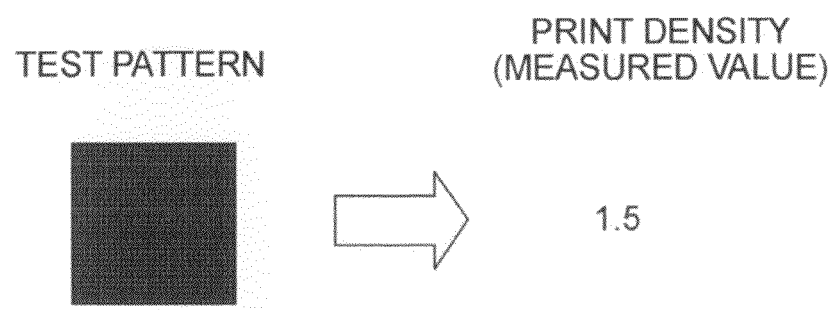

FIGS. 35A and 35B illustrate exemplary test patterns. FIG. 35A illustrates an example for measuring the print density at a plurality of points on a tone-level curve by preparing a plurality of density patterns. Alternatively, as shown in FIG. 35B, correction data can be determined by measuring a print density using one density pattern.

Alternatively, although not shown in FIGS. 35A and 35B, density patterns corresponding to all items of input data 0 to 255 may be printed.

Characteristics of a print head include, besides densities, displacement of positions where dots are formed. Therefore, test patterns suitable for the individual characteristics are used. The print result may have different characteristics due to a print mode, a medium to be printed, and image quality (color, monochrome, high-quality, photograph, text, draft, high-resolution, low-resolution, or the like).

Head-characteristic-improvement information according to these individual print conditions can be obtained by using print results in accordance with the individual print conditions. However, there may be a case where head-characteristic-improvement information according to a plurality of print conditions can be achieved from one print result.

(c) The above-described function of communicating head-characteristic-improvement information may be realized by equivalent hardware processing.

All the processing functions may be realized using hardware or software. Alternatively, some of the processing functions may be realized using a combination of hardware and software.

(d) Various modifications of the foregoing embodiments are conceivable without departing from the scope of the invention. It should be understood by those skilled in the art that various modifications, combinations, sub-combinations, and alterations may occur depending on design requirements and other factors insofar as they are within the scope of the appended claims or the equivalents thereof.

What is claimed is:

1. A print apparatus connected to a server via a network, comprising:
    an improvement-information requesting unit of the print apparatus configured to notify the server via the network of identification information unique to a print head;
    an improvement-information storage unit of the server configured to store downloaded head-characteristic-improvement information, wherein the downloaded head characteristic improvement information is transferred from a remote location; and
    a print processor configured to perform a print operation by referring to the head-characteristic-improvement information stored in the improvement-information storage unit of the server and further wherein the head-characteristic-improvement information is information that is based on analysis of print output from the print apparatus, the print output being scanned and transferred to a remote location for analysis and head-characteristic-improvement information is determined based on remote analysis of actual print output which is then transferred to the improvement information storage unit.

2. The print apparatus according to claim 1, wherein the head-characteristic-improvement information is information provided for each print head.

3. The print apparatus according to claim 1, wherein the head-characteristic-improvement information is information provided for individual head chips constituting the print head.

4. The print apparatus according to claim 2 or 3, wherein the head-characteristic-improvement information is tone-level correction data provided for each color.

5. The print apparatus according to claim 2 or 3, wherein the head-characteristic-improvement information is an error-diffusion boundary-value table provided for each color.

6. The print apparatus according to claim 2 or 3, wherein the head-characteristic-improvement information is information for selecting an error-diffusion boundary-value table provided for each color.

7. The print apparatus according to claim 1, wherein the head-characteristic-improvement information is information provided for each print element, each print element being a smallest print unit.

8. The print apparatus according to claim 1, wherein the head-characteristic-improvement information is information provided for each column of pixels.

9. The print apparatus according to claim 7 or 8, wherein the head-characteristic-improvement information is tone-level correction data provided for each color.

10. The print apparatus according to claim 7 or 8, wherein the head-characteristic-improvement information is correction data for correcting a head drive signal.

11. A method for improving print characteristics of a print apparatus, comprising:
    notifying a server via a network of identification information unique to a print head;

storing downloaded head-characteristic-improvement information in the server, wherein the downloaded head characteristic improvement information is transferred from a remote location; and performing a print operation by referring to the stored head-characteristic-improvement information stored in the server and further wherein the head-characteristic-improvement information is information that is based on analysis of print output from the print apparatus, the print output being scanned and transferred to a remote location for analysis and head-characteristic-improvement information is determined based on remote analysis of actual print output which is then transferred to the improvement information storage unit.

12. A computer program stored in a semiconductor memory of a microprocessor controlled system when executed by the microprocessor causing a print apparatus connected to a server via a network to perform a process comprising:

notifying the server via the network of identification information unique to a print head;

storing downloaded head-characteristic-improvement information in the server, wherein the downloaded head characteristic improvement information is transferred from a remote location; and performing a print operation by referring to the stored head-characteristic-improvement information that is stored in the server and further wherein the head-characteristic-improvement information is information that is based on analysis of print output from the print apparatus, the print output being scanned and transferred to a remote location for analysis and head-characteristic-improvement information is determined based on remote analysis of actual print output which is then transferred to the improvement information storage unit of the server.

* * * * *